United States Patent [19]

Scordato

[11] Patent Number: 4,881,259
[45] Date of Patent: Nov. 14, 1989

[54] ANSWERING MACHINE WITH CORDLESS TELEPHONE

[75] Inventor: James Scordato, Elmhurst, Ill.

[73] Assignee: Dynascan Corporation, Chicago, Ill.

[21] Appl. No.: 294,429

[22] Filed: Jan. 6, 1989

[51] Int. Cl.$^4$ ............................................. H04B 7/26
[52] U.S. Cl. ...................................... 379/58; 379/67;
379/56; 379/61; 340/311.1
[58] Field of Search ....................... 379/56, 57, 58, 61,
379/62, 67, 88, 63; 340/825.44, 311.1

[56] References Cited

U.S. PATENT DOCUMENTS

| | | | |
|---|---|---|---|
| 4,475,009 | 10/1984 | Rais et al. | 379/211 |
| 4,481,382 | 11/1984 | Villa Real | 379/61 |
| 4,499,567 | 2/1985 | Armstrong | 369/7 |
| 4,500,752 | 2/1985 | Lee | 379/61 |
| 4,571,457 | 2/1986 | Hattori et al. | 379/56 |
| 4,625,081 | 11/1986 | Lotito et al. | 379/88 |
| 4,640,987 | 2/1987 | Tsukada et al. | 379/62 |
| 4,650,931 | 3/1987 | Tsukada et al. | 379/61 |
| 4,680,785 | 7/1987 | Akiyama et al. | 379/57 |
| 4,706,274 | 11/1987 | Baker et al. | 379/67 |
| 4,747,122 | 5/1988 | Bhagat et al. | 379/57 |
| 4,747,124 | 5/1988 | Ladd | 379/67 |
| 4,759,052 | 7/1988 | Hashimoto | 379/67 |
| 4,782,508 | 11/1988 | Borchering et al. | 379/67 |
| 4,794,637 | 12/1988 | Hashimoto | 379/67 |
| 4,797,909 | 1/1989 | Mastromuro et al. | 379/67 |

FOREIGN PATENT DOCUMENTS

| | | | |
|---|---|---|---|
| 0024245 | 2/1983 | Japan | 458/73 |
| 0138134 | 8/1983 | Japan | 379/58 |
| 0036438 | 2/1984 | Japan | 379/58 |
| 0100659 | 6/1984 | Japan | 379/61 |
| 0085632 | 5/1985 | Japan | 379/58 |
| 0241443 | 10/1987 | Japan | 379/58 |
| 2051520 | 1/1981 | United Kingdom | 379/58 |

Primary Examiner—Robert Lev
Attorney, Agent, or Firm—Wallenstein, Wagner & Hattis, Ltd.

[57] ABSTRACT

A cordless telephone and an answering machine of the remote-pickup type are provided as an integrated unit having the answering machine and telephone base unit integrated into a common housing. The remote handset contains circuitry for generating a command signal condition at the user's option which will operate the base unit to a "screening mode" wherein the activity on the telephone lines during the playback and record period is transmitted to the remote unit, but wherein audio pass-through from the base unit radio receiver is disabled. In the preferred form of the invention the command signal condition is in the form of a pilot tone of a given frequency, receipt of which by the base unit receiver disables audio pass-through. To enter two-way "talk" mode, a pilot tone of different frequency is also sent by the remote unit, loss of this tone being being to cause the base unit to cease transmitting to the remote unit.

11 Claims, 15 Drawing Sheets

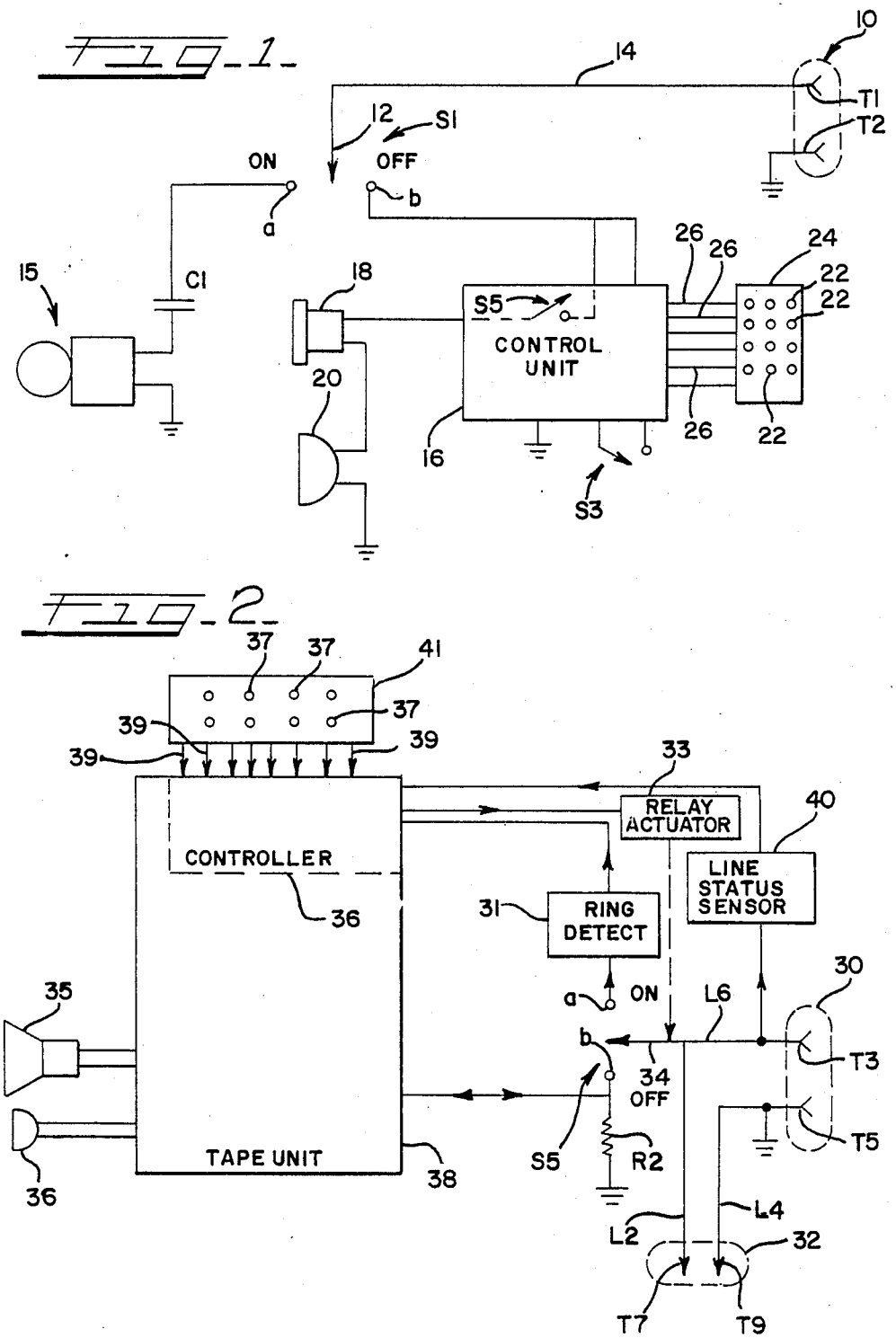

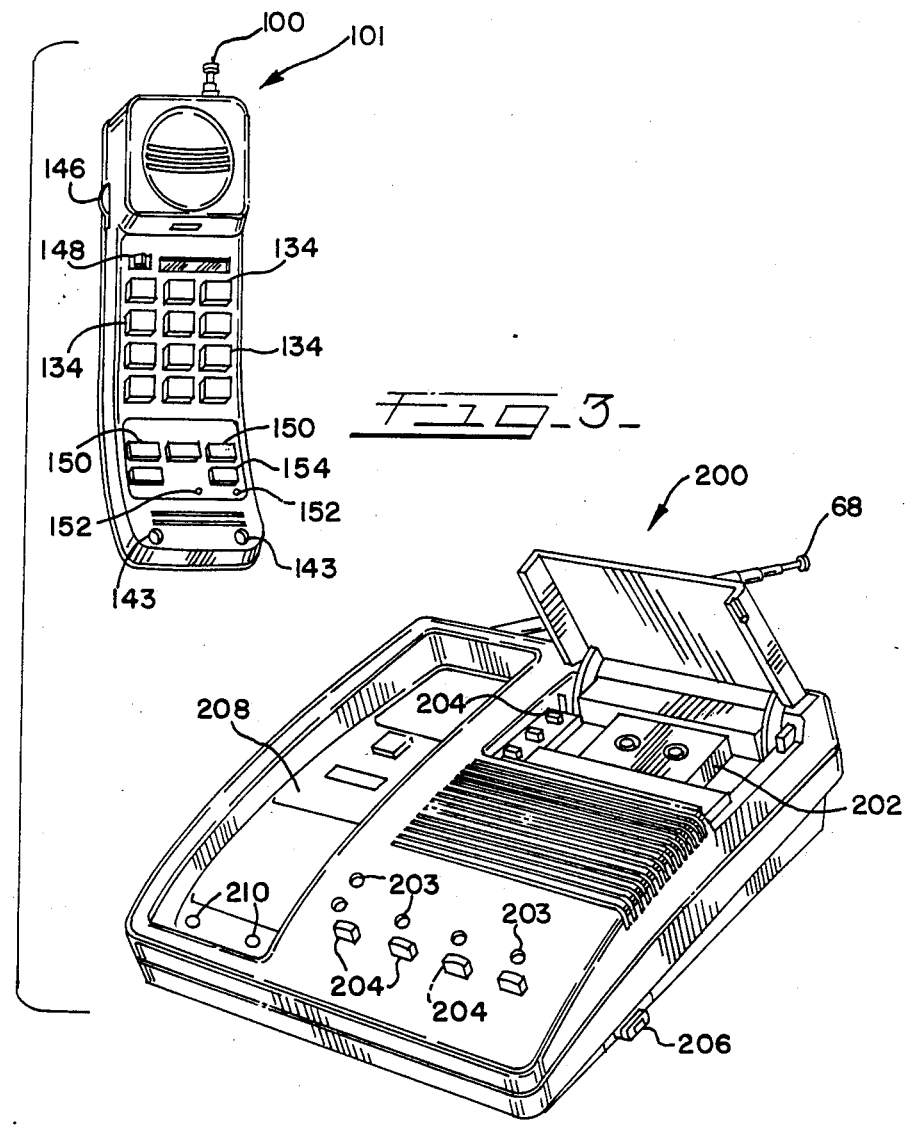

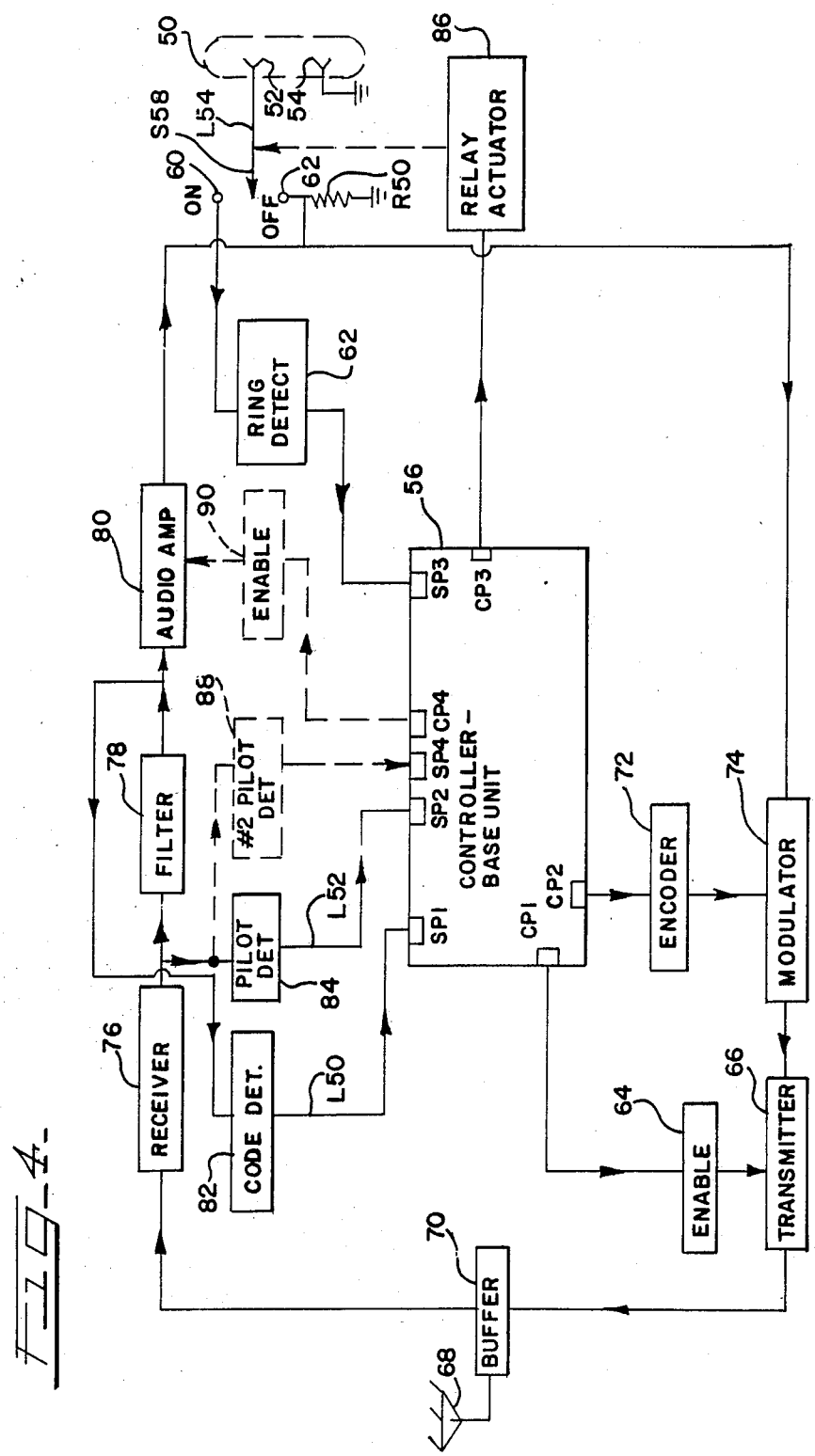

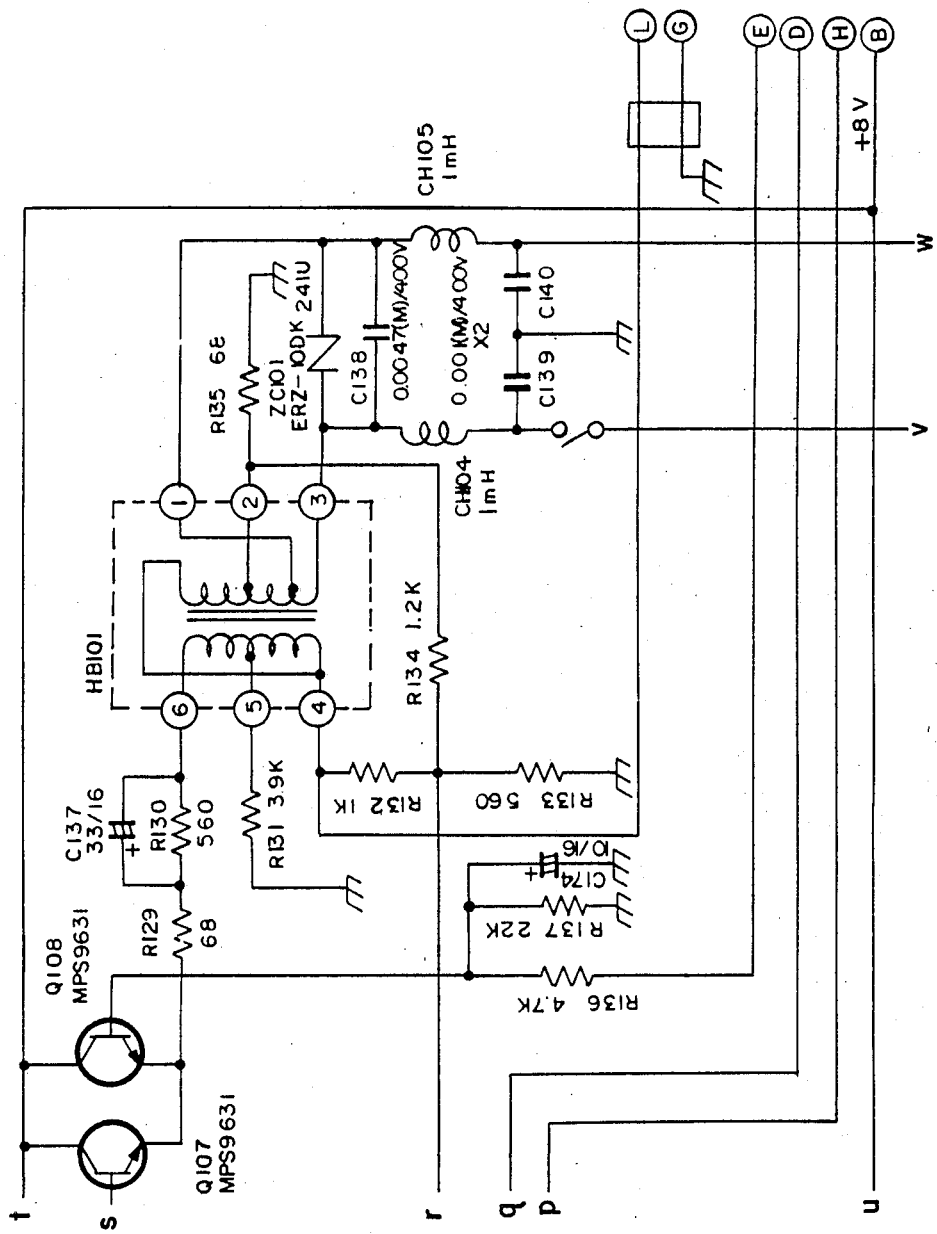

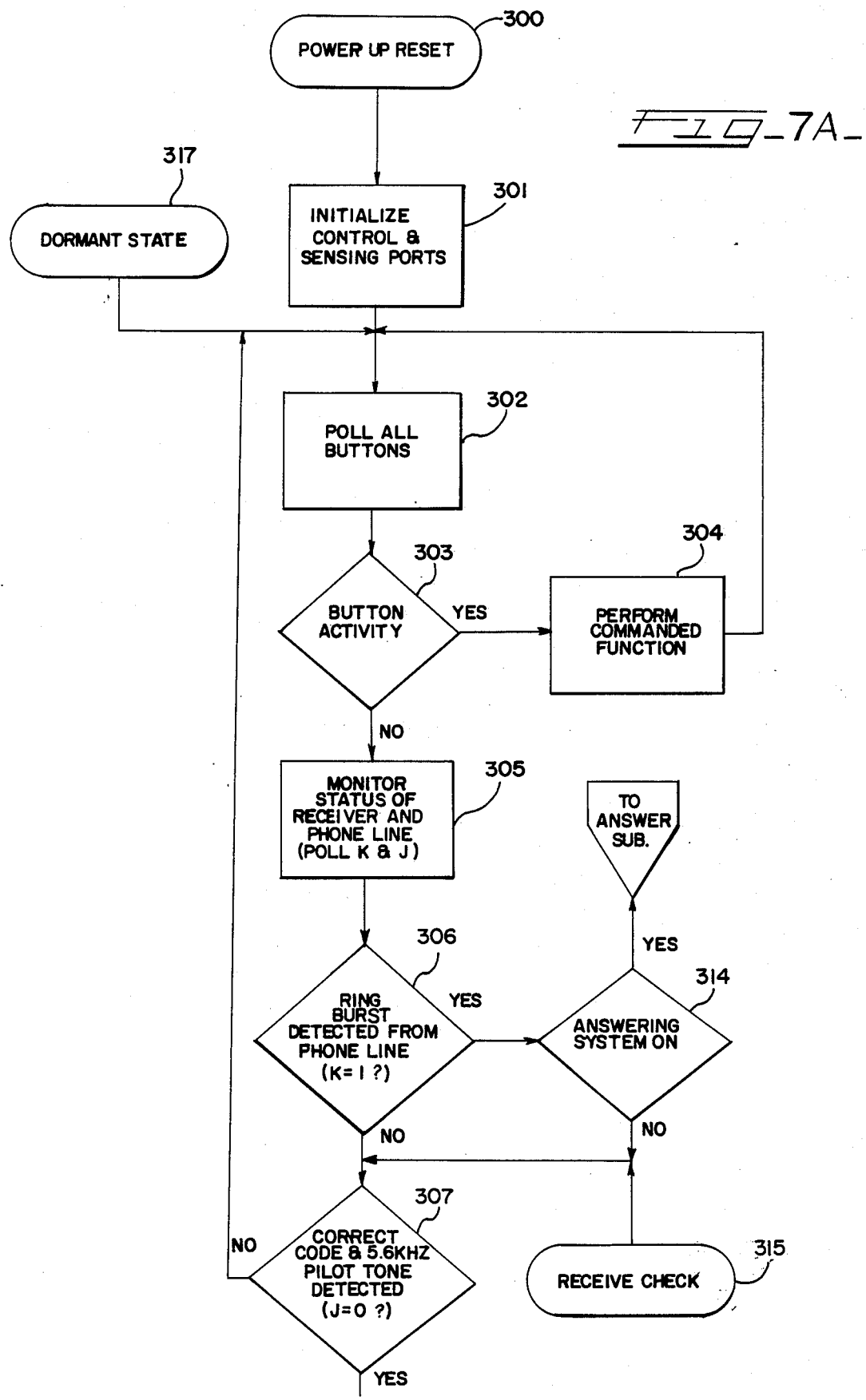
FIG-7A-

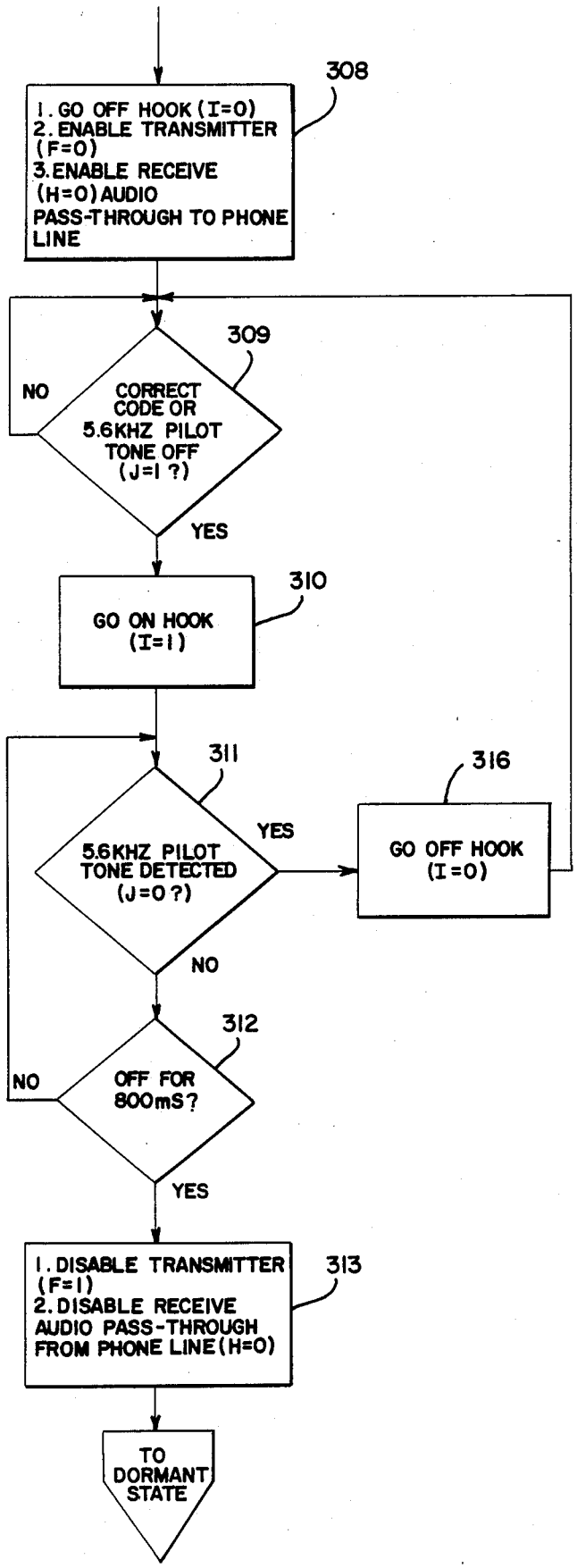
FIG-7B-

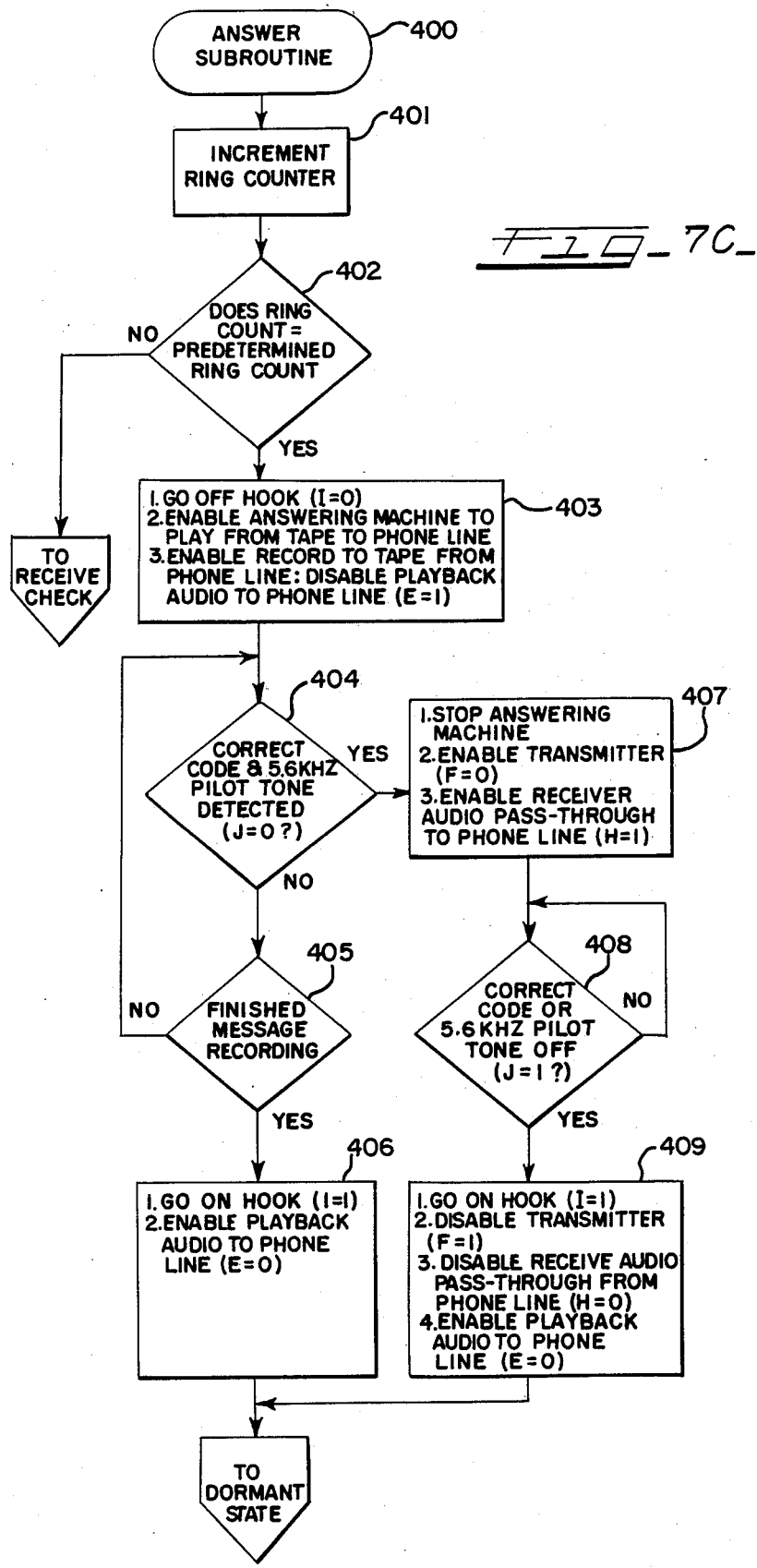

ANSWERING MACHINE WITH CORDLESS TELEPHONE

TECHNICAL FIELD

The technical field of the invention is telephone answering systems.

BACKGROUND PRIOR ART

Telephone answering systems are now commonly in use, and incorporate a magnetic tape recorder/player and related control circuitry adapted for connection to local telephone lines and to the base or cradle unit of a conventional telephone. They are programmed so that if the user does not pick up his telephone from the cradle within a prescribed number of ringing bursts announcing an incoming call, the control circuitry will automatically place an off-hook condition on the telephone line, whereupon the user's prerecorded announcement will be sent to the caller, requesting him to leave his message. Shortly thereafter the recorder is reverted to record mode to record the incoming message, thereafter shutting itself off automatically after a given period of time.

In addition to recording such incoming messages, the answering machine has the capability to play back the recorded messages later over a loudspeaker on the answering machine. Such machines are also normally provided with volume control which will either mute the loudspeaker completely, or allow it to play at a selected volume. This will allow the user at his option to listen to the incoming message, and if he decides that he wishes to converse with the caller, an override system is provided whereby he can pick up a telephone plugged into the answering machine and proceed to converse with the caller. A related feature, known as "remote pickup" will cause this overriding feature to be initiated by picking up any extension phone attached to the same telephone line. With the user in a remote location, he will hear the ringing signal, but will not be able to "screen" the incoming call to decide whether he wishes to speak to the calling party. He may either pickup the telephone or not pickup the telephone at his discretion. Such answering machines are commonly microprocessor-controlled to accommodate a great variety of mode changes and signals, i.e., incoming dial tone after the caller hangs up, automatic record/playback mode, user message recording mode, off-hook and on-hook interconnection to the telephone lines, and other features and modes.

Cordless telephones, completely unrelated to answering machines, are also quite common, such telephones comprising a base unit connected to local telephone lines and a cordless telephone-type handset which the user can carry around with him. The base unit and the handset each contain one of a pair of matched two-channel f.m. duplex transmitter/receivers establishing the communications link therebetween. The handset has a variety of mode switches adapted for various purposes, in particular to alternatively establish "standby" and "talk" modes. When an incoming call comes into the base unit, it sends a corresponding ringing signal to the handset. If the handset is in "standby" mode at the time, a buzzer in the handset emits ringing signal. The user then switches the handset to "talk" mode, at which time voice communication is then established between the base unit and the handset so that the user may talk to the calling party.

The base unit of such a cordless telephone may be plugged into any extension of a telephone line to which an answering machine of the remote-pickup type is connected, and the user will then receive the incoming ringing signal, and may at his option actuate his remote handset to "talk" mode, thereby establishing communication with the incoming caller. He will still, however, be under the disadvantage that he cannot exercise the previously mentioned call-screening function, since he is remote from the loudspeaker as was the previously mentioned case wherein he picks up a conventional extension telephone in a location distant from the answering machine loudspeaker.

There remains a need for a communication system whereby a remote cordless handset can be used interactively with an answering machine in a single integrated base unit, preferably powered by a single microprocessor, and in particular providing a call screening function of the type described hereinbefore.

SUMMARY OF THE INVENTION

According to one aspect of the invention an integrated telephone answering machine and cordless telephone base unit are provided. The answering machine is of the remote-pickup type. The unit has a single housing for the answering machine and a cordless telephone handset station or recess where the handset is stored when not in use and is being charged. This common housing thus uniquely forms a housing for the answering machine and the cordless telephone base unit, and has circuitry which permits this cordless telephone to interact in unique ways with the answering machine.

In accordance with a most preferred form of the invention, not necessarily requiring but preferably including the common housing disclosed above, a combined cordless telephone and answering machine gives the user an option not hitherto provided with prior art answering machines used in conjunction with a cordless telephone unit, namely the option of screening the incoming call to see whether the caller is a person he wants to talk to immediately, or whether he prefers to call that person back at a later time, or not at all.

As in a conventional cordless telephone, the handset of the instant invention generates a transmitted output signal responsively to user's operation of a handset switch from "standby" to "talk" mode. Receipt of this signal by the base unit receiver will then enable the base unit transmitter to transmit the calling party's voice to the remote receiver. Two-way communication is thus established, and can be established any time during or after receipt of a ringing signal from the base unit. The handset of the present invention contains, however, a provision for generating a unique command signal at the user's discretion, and the base unit is adapted to respond to receipt of this command signal condition to enable its associated transmitter to relay the incoming caller's message as he dictated it, but to prevent pass-through to the telephone lines of any signals received by the base unit receiver. The incoming caller's message is thus immediately relayed to the remote user; however, the caller is completely unaware that the user is listening in. The user may optionally initiate conversation by activating his remote unit to "talk" mode, establishing full two-way communication and stopping the answering machine.

According to a related and preferred feature of the invention, the screening command signal is provided in the form of an audio frequency pilot tone modulated onto the carrier produced by the handset transmitter, and the base unit receiver is provided with tone-sensing circuitry responsive to receipt of this tone to hold an associated pass-through audio amplifier in a blocking condition to prevent transmission of received signals in the telephone lines.

By the foregoing means the user is thus provided with a call screening feature in a cordless telephone which has not even been hitherto available in an answering machine interacting with a corded extension telephone placed in a remote location.

Other features and advantages of the invention will become apparent upon making reference to the specification, claims and drawings to follow.

DESCRIPTION OF THE DRAWINGS

FIG. 1 is a block schematic diagram of a conventional household telephone.

FIG. 2 is a functional schematic diagram of an automatic answering machine.

FIG. 3 is a perspective view showing a cordless telephone base unit integral with a telephone answering machine and remote handset unit.

FIG. 4 is a block schematic diagram of the principal circuit elements of a conventional cordless telephone base unit. Shown in dotted outlines are additional elements required to practice the invention.

FIGS. 6A–6H are a schematic diagram of a cordless telephone base unit configured for interaction with a microprocessor-controlled answering machine.

FIGS. 7A–7C are flow charts showing the interactions of a microprocessor with the circuit shown in FIGS. 6A–6F.

DESCRIPTION OF THE INVENTION

Figure 5:
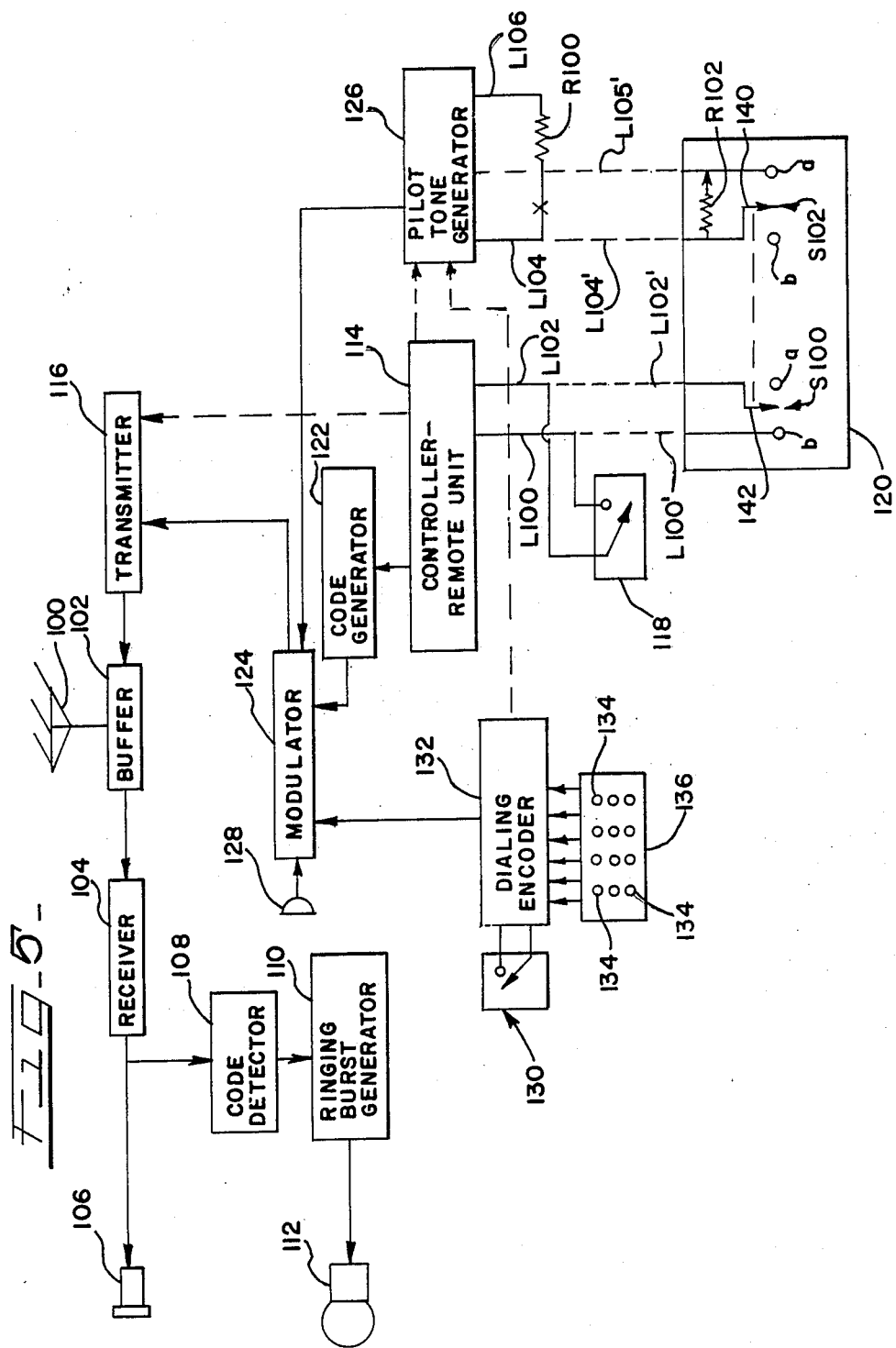
FIG. 5 is a block schematic diagram of the major functional elements of the remote unit of a cordless telephone. Shown in dotted outline are leads making connections to an auxiliary switching unit providing a feature, of the invention.
Figure 6A:
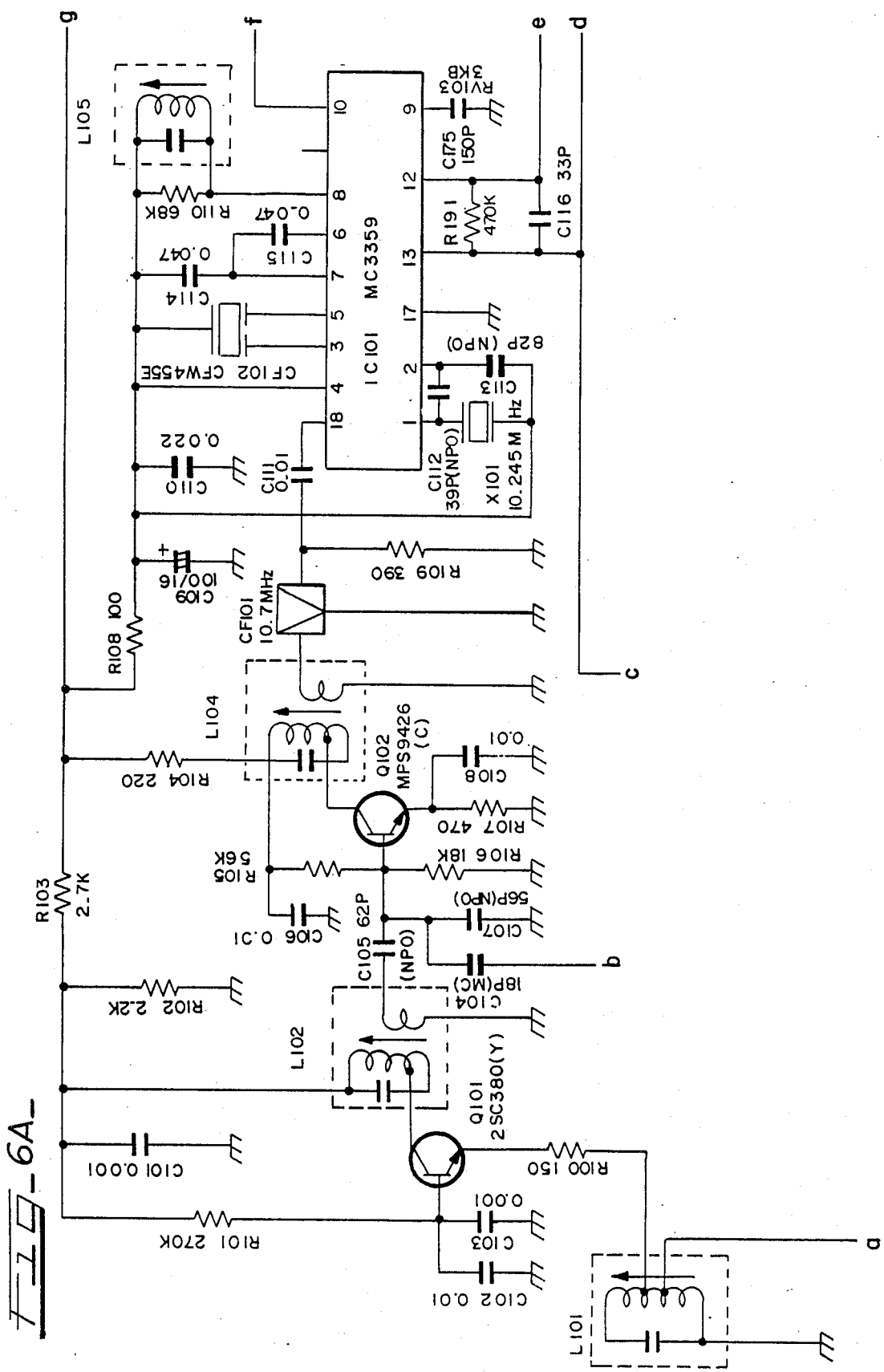
Figure 6B:
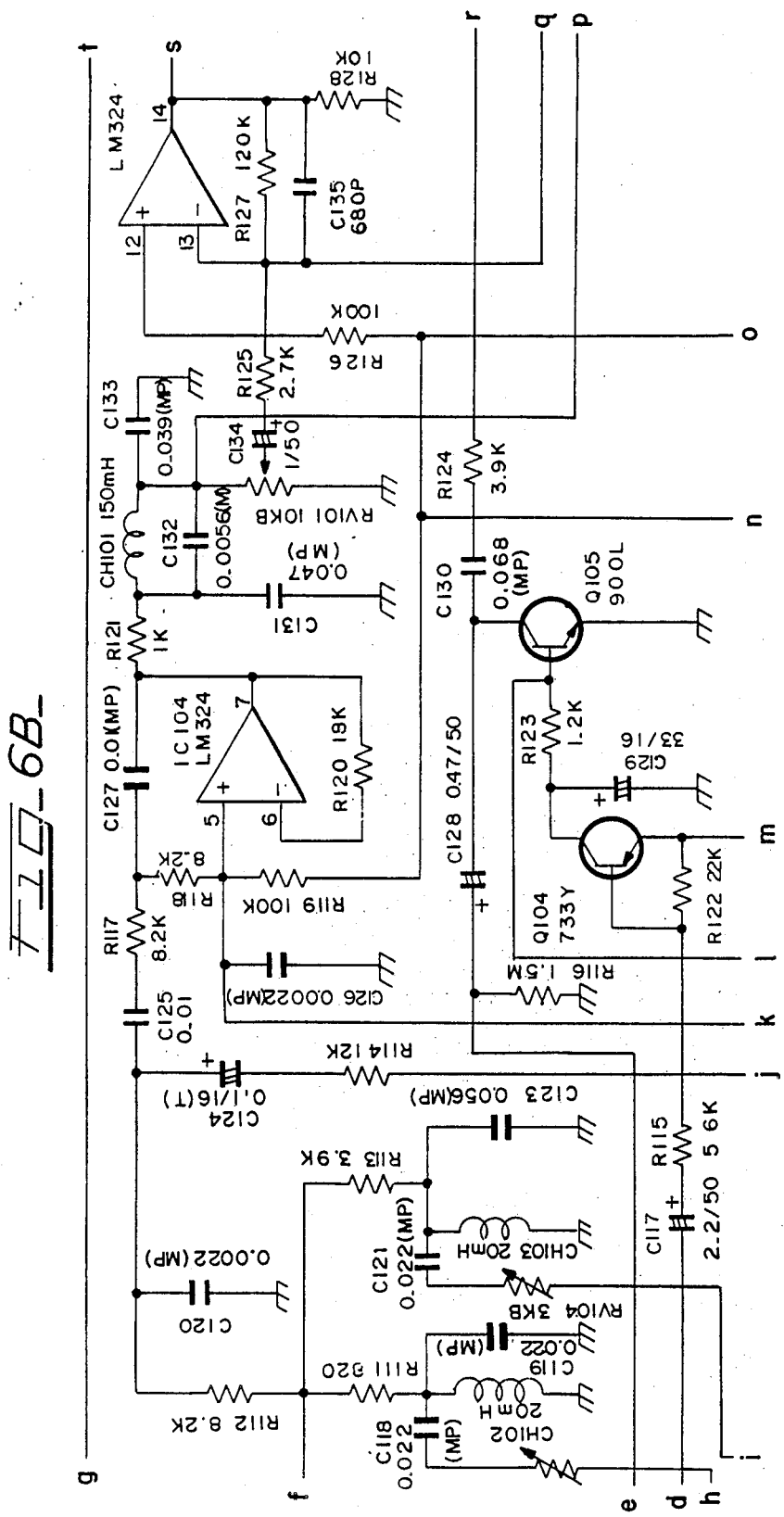
Figure 6D:
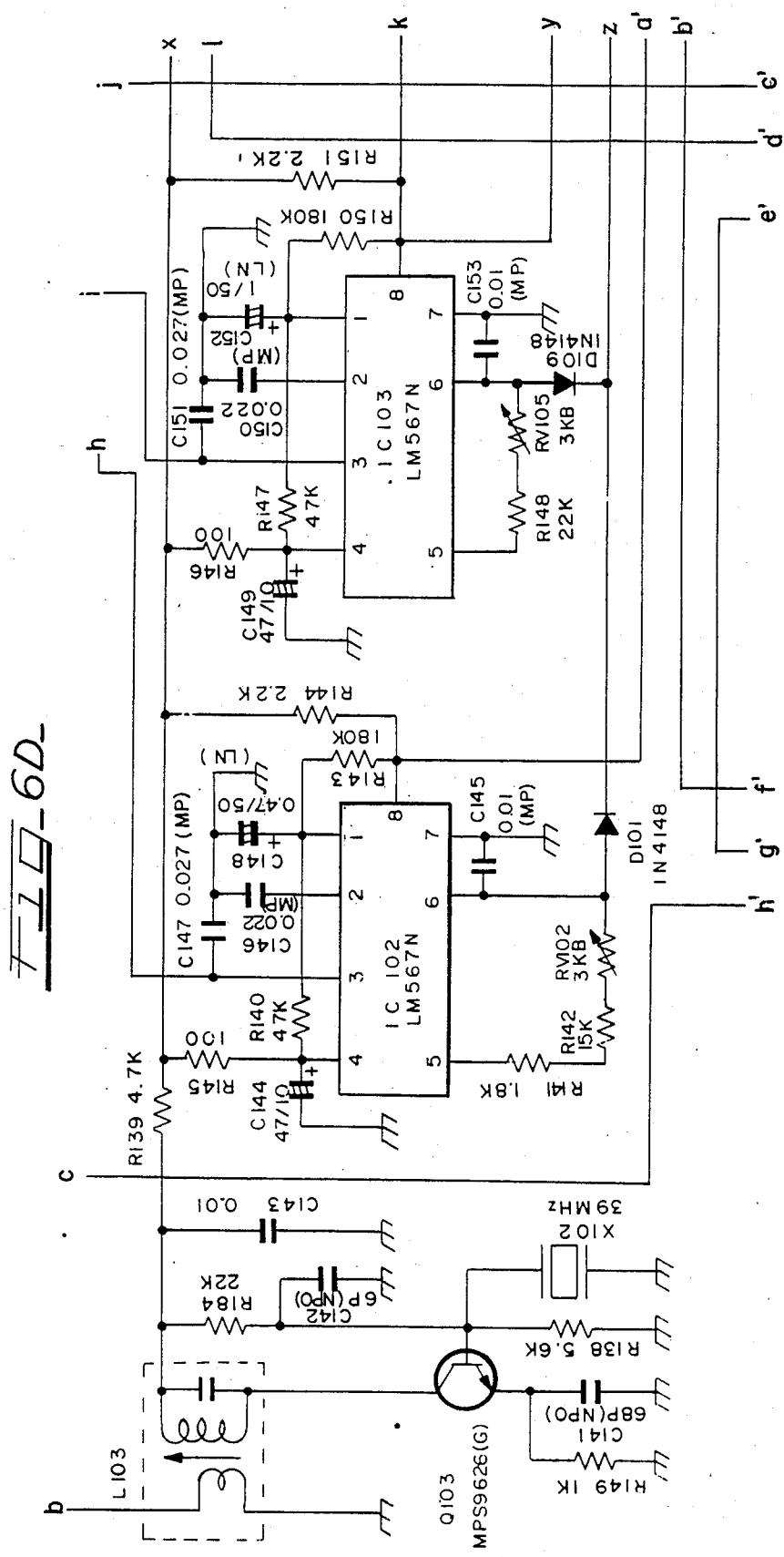
Figure 9E:
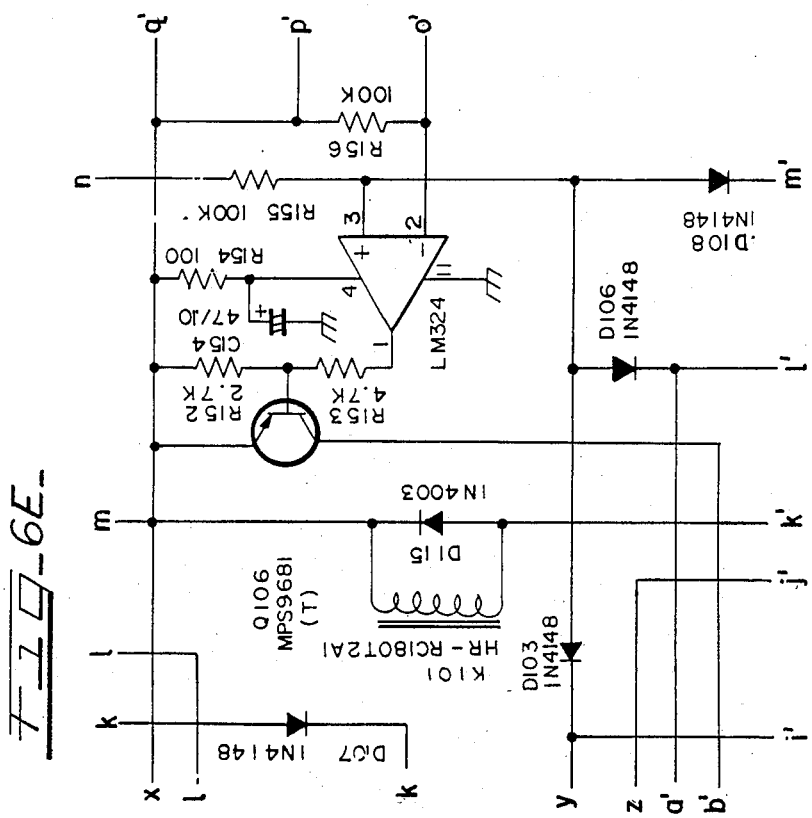
Figure 6F:
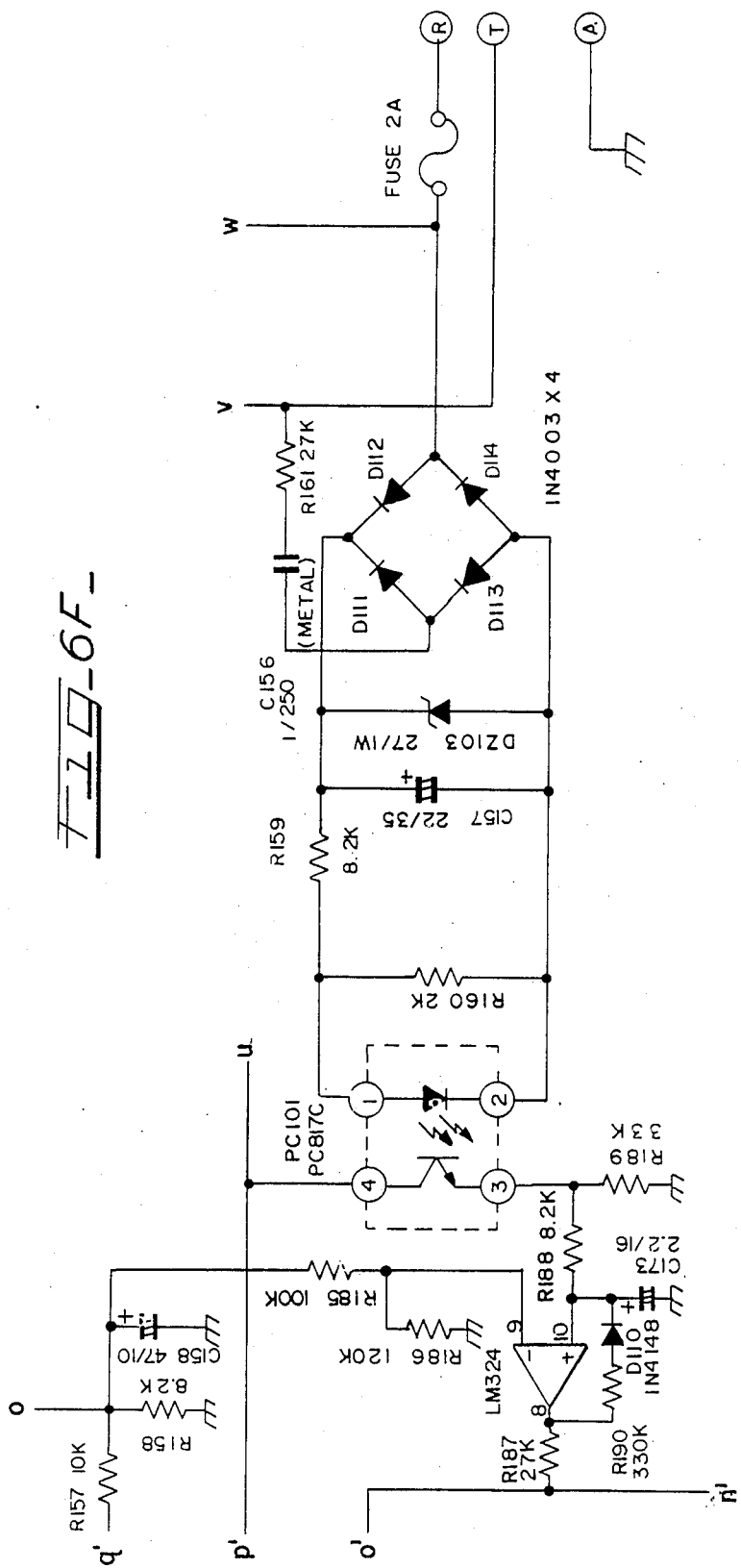
Figure 99:
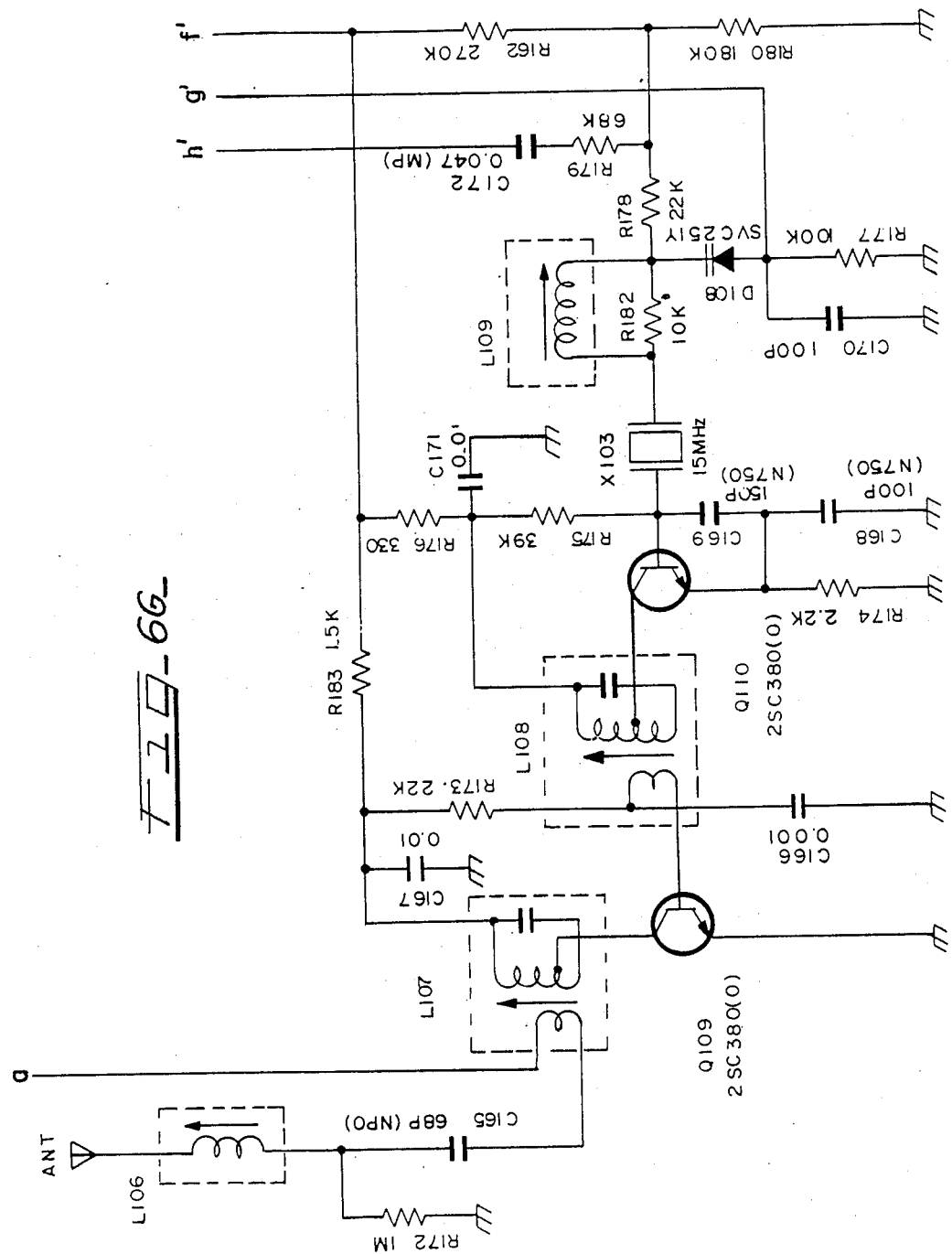
Figure 6H:
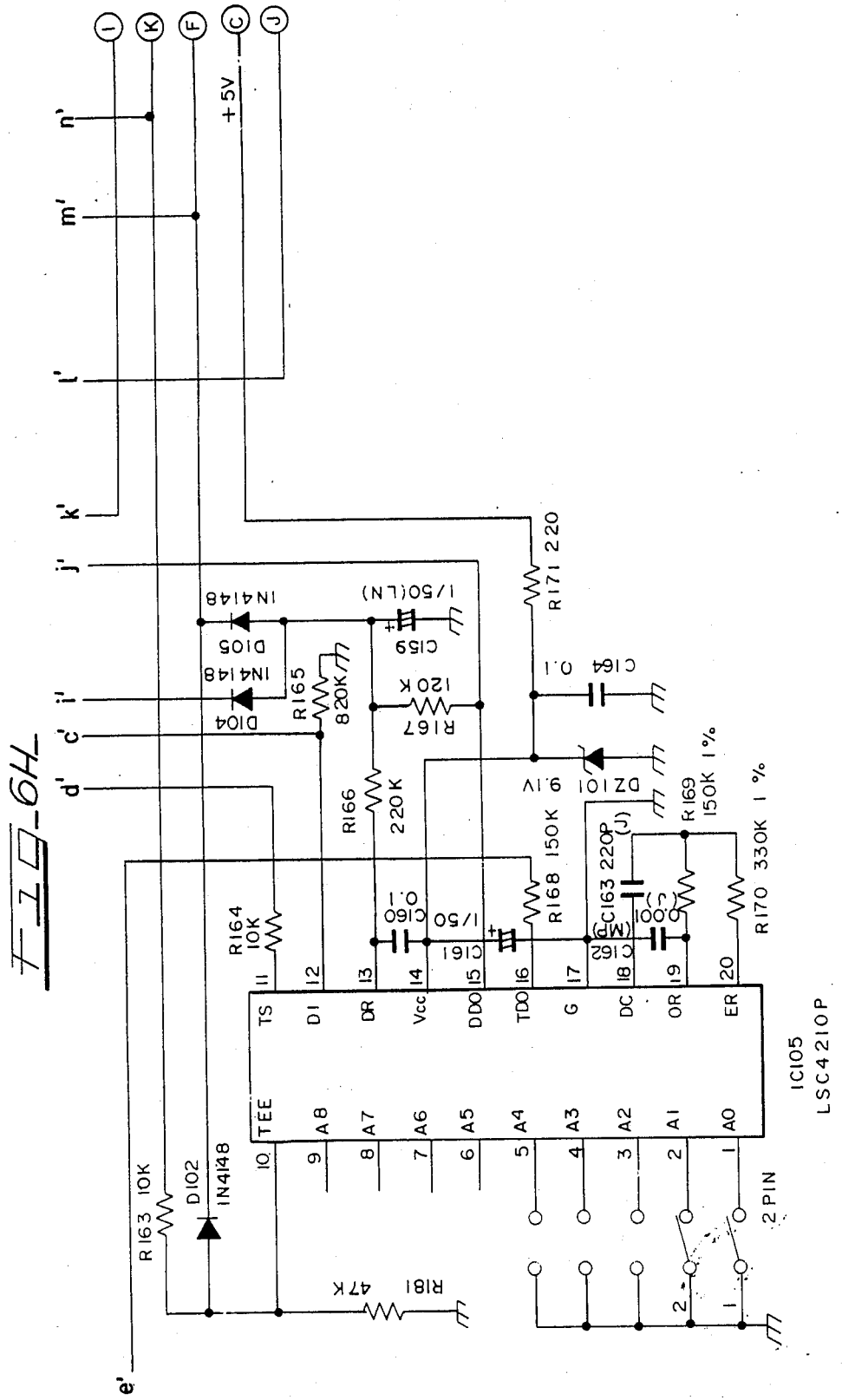

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

The present invention integrates the base unit of a cordless telephone with a telephone answering machine so that the user may actuate his remote handset unit from "standby" to "talk" condition to converse with the calling party at his convenience. Both the base unit and the remote unit automatically transmit matching "family codes" so that incoming ringing signals actuate the buzzer only in a matching remote unit, and the base unit only responds to command signals from the remote unit similarly bearing the proper identifying code. A special "screening" feature is provided so that, upon receiving a ringing signal, the remote user can generate a control signal condition, preferably by generating a pilot tone shifted from its normal pilot tone frequency. Receipt of this tone by the base unit causes the base unit to transmit the caller's incoming message, while disabling the base unit receiver from signal pass-through to the telephone lines, so that the calling party is not aware that his conversation is being monitored. The user may, at his option, establish two-way communication with the incoming caller by actuating his remote unit to a normal "talk" condition causing the transmitted pilot tone from his remote unit to be shifted back to its normal frequency, whereupon the base unit reverts to normal two-way communication with the audio-pass-through of the base receiver unit enabled.

Because the behavior of the telephone lines under various conditions strongly governs the behavior of much of the circuitry of the present invention, the interaction of a conventional household telephone with its associated telephone lines will be discussed first, with specific reference to FIG. 1. Next, a conventional answering machine will be discussed with specific reference to FIG. 2, the answering machine being of the "remote pick-up type" wherein the answering machine will revert to dormant status immediately upon pick-up of any household telephone connected to the household telephone line. Next, and with particular reference to FIGS. 4 and 5, a conventional cordless telephone base unit and receiver will be described, the base unit being configured to attachment to telephone lines to work in conjunction with an answering machine of the type generally shown in FIG. 2 in diagrammatic form. Finally, there will be discussed modifications of the remote unit and base unit in FIGS. 4 and 5 to accommodate transmission of, and response to a special user-actuated pilot tone which causes the base unit to enter the screening mode described above.

FIG. 1 shows in block diagrammatic form the principal elements of a conventional household telephone. A line jack 10 has terminals T1, T2 adapted for connection to the high and ground sides of household telephone lines respectively. The high side of the telephone line connected to T1 is brought to the rotor 12 of a single-pole-double-throw switch having poles a, b. The rotor 12 is spring-loaded and the weight of the telephone handset will force rotor 12 into contact with pole a. This is the on-hook condition. An alarm 14 is connected through isolation capacitor C1 to pole a and to ground. Under such conditions the high telephone line 14 will be at a nominal system voltage at 48 volts. An incoming call is announced by a low frequency ringing signal placed on the telephone line, thereby actuating the alarm bell 15. When the user picks the handset off the cradle, rotor 12 of switch S1 then contacts pole b. This is the off-hook condition.

Household telephones in use today are preferably designed so that they are compatible with either "touch tone" or regular pulse dialing type telephone central office systems. This is accomplished by means of a control unit 16 powered from the telephone lines. The touch tone or pulse dialing option is established by the user by the setting of a mode switch, here functionally shown as switch S3. Conventional pulse dialing mode will be considered first.

When the user picks of the telephone handset, an internal switch S5 is closed, connecting an earphone 18 in series with a microphone 20 to pole b of switch S1. The connection of these elements to the telephone line drops its voltage of a nominal 48 volts to a nominal 6 volts, this drop being relayed to the telephone system central office to terminate the ringing signal and to connect the system for normal two-way communication. For outgoing calls with the switch S1 off-hook, the user simply actuates selected dialing pushbuttons 22—22 of a switching block 24 connected to the control unit 16 via lines 26—26. The control unit 16 responds to each pushbutton depression by momentarily opening switch S5 the corresponding number of times, i.e., if the pushbutton for dialing the number 3 is depressed, the control unit 16 will momentarily open switch S5 three times sequentially. This allows the line 14 to momentarily rise to its high value three times, each released condition being noted at the central office as a dialing pulse element to actuate the central office to respond to the number being dialed.

If the tone dialing system is used, switch S3 is established at its opposite position, permanently closing switch S5, and each depression of one of the buttons 22—22 sends its associated dual frequency tone out pole b of switch S1, and thus out on to the telephone line 14.

Considering next telephone answering machines in general, and with specific reference to FIG. 2, an input jack 30 is provided with input terminals T3, T5 configured with connection to household telephone lines. An auxiliary line pair L2, L4 are connected to terminals T7, T9 of an output jack 32 for connection to a local telephone unit of the type shown in FIG. 1. The high side of the telephone line (hereinafter referred to simply as "telephone line") is connected to the rotor of a single-pole-double-throw switch S5.

In the dormant state of the machine the rotor 34 of switch S5 is established to be in contact with pole a. An incoming ringing signal is thus relayed to the controller via pole a and a ring detector 31, the controller 36 normally being programmed to respond after a preset number of ringing signals to actuate the switch S5 to contact pole b by energizing a relay actuator 33. This immediately places the load of resistor R2 on the telephone line L6, thereby signaling to the central office that pick-up has occurred. The controller 36 then actuates a tape unit 38, having an associated playback loudspeaker 3 and recording microphone 36 to play back a recorded message to the telephone lines L6 via pole b of switch S5. After transmission of the message, the controller actuates the tape unit to record mode for a preset period of time. At the end of this time the controller 36 will actuate the tape 38 back to the dormant mode, at this time actuating switch S5 back to the on-hook condition, i.e. contacting pole a.

An override is preferably provided whereby the controller 36 will automatically revert to the dormant mode in the event that the user picks up his telephone connected to jack 32. As previously discussed, the tape unit 38 is still in the active mode, the switch S5 will be on-hook, i.e., contact with pole b, and picking up the associated telephone connected to jack 32 will throw an additional load on line L6. Such an additional load is detected by a line status sensor 40 connected to the telephone line, the resulting additional line voltage drop being relayed to the controller 36 to actuate the tape unit to dormant mode. The user may thus communicate with the calling party. During this period, the controller having actuated the tape unit 38 to the dormant condition, the switch S5 has also been actuated to the on-hook condition, and when the user hangs up his telephone the line L6 is then fully released to signal the central office that the call has been completed.

The line status sensor 40 may also be designed to sense restoration of dial tone in the event that the calling party hangs up without leaving a message, the status sensor then actuating the controller 36 to cause the tape unit 38 to revert to the dormant mode. The status sensor 40 may also be designed to so respond to prolonged periods of line service and repetitive signals. A manual control block 41 having a number of function buttons 37—37 is provided interacting with the controller 36 via lines 39—39. User operation of the function buttons 37—37 selectively causes the tape unit to play back recorded incoming messages on the loudspeaker 35, accept and record a new announcement from the user via microphone 36, and other related user-commanded functions. In particular, there is also normally provided an "answer" button which toggles the controller between an active state to answer incoming calls and record the caller's message and an inactive state wherein such interaction is disabled.

Considering next a conventional cordless telephone system, and with particular reference to FIGS. 4 and 5, the sequence of events and "handshaking" protocols will be discussed first with respect to "base-initiated," i.e., incoming call. The base unit is provided with a jack 50 having terminals 52, 54 adapted for connection to household telephone lines. Overall system control is carried out by a base unit controller 56. In the dormant mode the base unit control 56 actuates a single-pole-double-throw switch to contact pole 60. A ringing detector 62 connected to pole 60 thus constantly monitors the line for ringing bursts received from the central office. Upon receipt of each ringing burst at sensing port SP3, the controller 56 actuates an enabling circuit 64 via control port CP1 to activate an f.m. transmitter 66 to a transmitting condition. Radio frequency signals in the 46 to 50 megahertz range are then fed to an antenna 68 through a buffer 70. At this same time, the controller 56 acts via control port CP2 to cause a "family code" to be outputted from an encoder 72 to a modulator 74 acting on the transmitter 66. Each base unit/remote unit pair is preferably assigned a fixed "family code" at the manufacturing installation. This may, for example, be stored in read-only-memory, or other means well known in the art. This code, being a binary number, is sufficiently large that the likelihood of two cordless telephone systems within communication range of each other will have identical codes is quite remote. Additionally, to cope with such unusual situations, several bits in the code string may optionally be selected by the user and entered through switches provided on his base and remote unit.

This unique "family code" is transmitted by the transmitter 66 upon receipt of each individual ringing signal. The base transmitter 66 is enabled only sufficiently long to send out this digital code, this code being preferably in the form of sequential high and low frequency shifts (frequency shift keying) representing the coded bit string. To increase the likelihood of positive signal acquisition by the receiver in the event of strong local noise, this code is preferably sent twice responsively to each individual ringing burst or pulse received from the telephone lines. The transmitter 66 does not transmit during the interval between ringing pulses, and will cease transmission if the incoming caller hangs up without having been answered.

Considering next the remote unit circuit shown in FIG. 5, the twice-transmitted "family code" is picked up by a receiving antenna 100, passed through a buffer 102 to a receiver 104. Connected to the receiver 104 is an earphone/loudspeaker 106 and a code detector 108. A code detector 108 is configured to respond to receipt of the preset "family code" in the encoder 72 of the base unit. Positive acquisition and identification of either of the two "family codes" transmitted in the pair will cause actuation of a ringing burst generator 110 which generates a timed 1.3 kilohertz pulse train of preset duration to actuate a ringing buzzer 112.

Overall system control of the remote unit is exercised by a controller 114. In the dormant condition of the handset, i.e., before the user has taken any action in response to receipt of the ringing signal from the buzzer 112, the remote unit transmitter 116 is held in a dormant condition. Upon receipt of the ringing signal, the user actuates his remote unit from dormant (standby) mode to active (talk) mode by operation of a suitable systems switch means 118, here shown in symbolic form as a simple single-pole single-throw switch connected to the controller 114 via lines L100 and L102. It will also be noted that connected to lines L100 and L102 via phantom leads L100' and L102' is a call screening switching system 120, which represents a modification of the conventional remote unit discussed thus far, and which serves to implement a principal novel feature of the present invention. It will be discussed subsequently Upon actuation of the controller 114 to the talk mode by the system switch means 118, a code generator 122, programmed to generate the same code sent out by the base unit, sends this code to a modulator 124 connected to the remote unit transmitter 116. These signals are, as before, digital strings in the form of frequency-shift-keying. Simultaneously with transmission of the frequency-shift-keyed "family code" pair, the controller 114 actuates a pilot tone generator 126 to output a 5.6 kilohertz tone continuously to the modulator 124. Thus the "family code" pair is accompanied by a continuously broadcast 5.6 kilohertz pilot tone. The remote unit has thus responded to the base unit.

Such an audio frequency pilot tone may be generated by a variety of means, the simplest of which will involve at least one resistor as a frequency-determining element. Such an element is here shown as a resistor R100 connected to the pilot tone generator 126 by leads L104 and L106 respectively. As before, the connection to the screening mode control switch system 120 indicated by phantom leads L104' and L105' are to be ignored for the present. Simultaneously with the transmission of the 5.6 kilohertz pilot tone, the user's voice will be communicated to the modulator 124 by means of a microphone 128. Except for minor interruptions during pulse dialing from the remote unit, the pilot tone will always be sent out by the transmitter 116 when the remote unit is in "talk" mode.

At the base unit the response is as follows. The received signals are passed by a base unit receiver 76 (FIG. 4) via a low-pass filter 78 removing all frequency components above approximately 3 kilohertz, and hence any pilot tone, to an audio amplifier 80. The "family code", now being in the form of a binary string, is passed from the output of the filter 78 to a code detector 82. If a match is secured between the received "family code" and the code detector 82, the code detector output line L50 is activated to relay this information to sensing port SP1 of the controller 56. Also connected to the output of the receiver 76 is a pilot tone detector 84. Detection of the pilot tone by a pilot tone detector 84 will cause an acknowledging condition to be placed on output line L52, similarly relayed to the controller at sensing port SP2. The controller 56 responds to a code match followed by a continuous pilot tone receipt by activating an enabling circuit 64 via port CP1 to turn on the transmitter 66. Except for momentary interruptions in the pilot tone during remote pulse dialing, as will be discussed subsequently, as long as pilot tone acquisition is maintained by the base unit receiver 76, the transmitter 66 will remain on.

Simultaneously with the enablement of the transmitter 66, the controller 56 actuates a relay actuator 86 via control port CP3 to operate the line switch S58 to the off-hook condition, i.e., contacting pole 62, and thus immediately loading the telephone line L54 through pull-down resistor R50. As previously discussed, so loading the telephone line informs the telephone central office that ringing is to be terminated, and that normal conversation is to begin. With switch S58 off-hook, incoming telephone communications are sent via pole 62 to a modulator 64 to transmit the calling party's voice to the remote unit via the transmitter 66. The user's voice communications are then relayed from the audio amplifier to pole 62 of the line switch S58, and hence to the calling party, via line L54.

The user hangs up his remote unit simply by actuating switch 118 to the "standby" condition. Responsively to this, the controller 114 actuates the code generator 122 to send another "family code" frequency-shift keyed pair, and immediately thereafter deactivates the remote unit transmitter 116. At the base unit, receipt of this second code pair by the code detector 82, or subsequent loss of pilot tone as evidenced by the output state of the pilot tone detector 84, will cause the controller 56 to disable the base unit transmitter 66 via the enabling circuit 64, and will further operate the line switch S58 to the on-hook condition, i.e., contacting pole 60. Both the base unit and the remote unit are now in the dormant state.

In the case of a user-initiated call using the remote unit, this is initiated by the user operating mode switch 116 from the "standby" to the "talk" condition. As before, "family code" pairs and the 5.6 kilohertz pilot tone are immediately sent via the transmitter 116. With the base unit in the dormant state, i.e., switch S58 in the on-hook condition, the controller 56 reacts to receipt of either of the code pairs changing the status of line L50 followed by maintenance of a continuous pilot tone changing the status of line L52 to actuate switch S58 to the off-hook condition, and further enabling the transmitter 66 to an active condition.

Consideration will be first given to pulse-dialing telephone systems. To accommodate such systems, a dialing mode switch 130 is provided acting upon a dialing encoder 132, this encoder being also responsive to depression of the various pushbuttons of the dialing block 136 of the remote unit. In pulse dialing mode, in a similar manner as described with respect to a conventional telephone as shown in FIG. 1, depression of, for example, the 3 push-button of the dialing block 136 will cause the dialing encoder 132 to inhibit the pilot tone generator 126 for three sequential brief periods each of approximately 100 milliseconds duration. Thus each digit sequentially selected by the pushbuttons 134—134 is represented by a corresponding number of sequential interruptions of the output of the pilot tone generator 126.

At the base unit, these brief interruptions at the pilot tone serve, as before, to actuate the line switch S58 to an on-hook condition; however, immediately upon restoration of the pilot tone, the switch S58 is actuated back to the off-hook condition. Thus, as in the case of the above mentioned telephone, the telephone line L54 is released a number of times in sequence dialing digits to the telephone central office. As before, receipt of the pilot tone enables the transmitter 66. The transmitter enabling circuit 64 is configured to be slowly responsive to disabling control signals of 800 milliseconds duration. The transmitter 66 thus remains on during dialing.

In the case of tone dialing systems, operation of the dialing mode switch 130 to the tone dialing position causes tones identical with those produced in the conventional telephone shown in FIG. 1 to be sent to the modulator 124 to be transmitted in a manner similar to the transmission of voice information from the microphone 128. At the base unit receiver a continuous capture of the 5.6 kilohertz pilot tone, is established by the pilot tone detector 84, and the dialing tones are simply passed through the low pass filter 78 and the audio amplifier 80 out to the telephone line L54.

The foregoing discussion to this point has dealt with automatic answering machines and cordless telephones. It will be appreciated that the cordless telephone system shown in FIGS. 4 and 5, being connectable to ordinary telephone lines, in the same manner as a conventional telephone, could therefore similarly be connected to a conventional answering machine as shown in FIG. 2. Thus, the base unit shown in FIG. 4 could have its input jack 50 connected to the telephone lines feeding the answering machine in FIG. 2 via jack 32. The remote user will know when his answering machine is receiving an incoming call because the ringing signal will be transmitted to him. He will be optionally in position to speak directly with the caller by his remote unit from "standby" to "talk" position. His remote telephone system will thus interact with the answering machine and the telephone lines in exactly the same manner that would occur if, in the alternative, he simply were to pick up a conventional telephone connected to the answering machine.

What he does not have, and what is desirable to provide, is a means whereby he can listen to the caller dictating his message to the answering machine without letting the caller know that the user is listening in. Such a "screening mode" is available to the user who is close to his answering machine and can listen to the loudspeaker 35 during the recording phase. Such a corresponding feature has yet to be provided in a cordless telephone system designed for interaction with an answering machine. This is achieved by modifying the remote unit (FIG. 4) and the base unit (FIG. 5), as will next be discussed.

It will be recalled with respect to the remote unit (FIG. 5), that the pilot tone generator 126 has associated therewith a frequency determining resistor R100. The user signals to the base unit to enter into screening mode by operation of a screening mode switch system 120, here shown schematically as containing a pair of coupled single-pole-throw switches S100, S102. The switch S100 is the functional equivalent of the "standby"/"talk" mode switch 116 symbolically shown. Leads L100 and L102 are shown connected by phantom leads L100' and L102' to a similarly configured switch S100. Lead L104 is broken as indicated to be connected by leads L104' L105' to a resistor R102 and to the rotor 140 of switch S102 and pole a thereof. As indicated, the rotor 140 of switch S102 and the rotor 142 of S100 are ganged together. Switches S100 and S102 are preferably of the momentary contact type, and will here be presumed to be urged in the dormant state to contact their respective poles a,a. This will be taken to be the "standby" configuration of the switching system 120. Under such conditions the resistor R102 is shorted out, and total value of resistance inserted between line L104 and L106 is only that which is established by the value of R100, i.e., the normal pilot tone frequency of 5.6 kilohertz.

Upon receipt of a ringing signal at the buzzer 112, the user may optionally enter "screening" mode by actuating the switch assembly 120 so that the switches contact their respective poles b. The switches S100 and S102 contact their respective poles b—b respectively. The remote unit controller 114 then proceeds as before; however, now the total resistance governing the pilot tone generator frequency is the series combination of the resistors R100 and R102, resulting in a generation of a lowered pilot tone frequency of 4.1 kilohertz. Thus, all of the previously described functions which were carried out when entering "talk" mode by operation of switch 118 are carried out upon entry into screening mode, except that a 4.1 kilocycle pilot tone is generated instead.

Referring next to FIG. 4, it will be noted that the base unit is further provided with a 4.1 kilohertz pilot tone detector 88 actuating sensing port SP4 of the base unit controller 56 responsively to receipt of a 4.1 kilohertz pilot tone. Further, an enable/disable circuit 90 is operatively controlled by the base unit controller 56 from control port CP4 to operate the audio amplifier 80 to pass/no-pass condition. When in the no-pass (disabled) condition, any voice communication, atmospheric noises or other interference received by the receiver 76 which normally would pass through the filter 78 will not be relayed to the telephone lines. Thus upon initial receipt of the "family code" actuating the code detector 82, followed by the 4.1 kilohertz pilot tone, the base unit controller 56 operates as previously, except that it additionally operates the enable/disable circuit 90 to disable the audio amplifier 80. The remote user is thus able to listen in on the incoming messages without making the calling party aware that he is listening.

To initiate normal conversation the user releases pressure on the switch assembly 120, causing remote system reversion to "standby" mode. Transmission from the remote unit thus ends, and the base unit controller 56, having lost all pilot tone, will revert to the dormant non-transmitting condition. Thereafter the user simply operates the remote switch 118 from "standby" to "talk" position, the normal signal protocols are generated, and the base unit controller 56 once again reestablishes normal communication so that the user may converse with the calling party.

Thus, by modifying a remote unit to optionally transmit a pilot tone of a different frequency, by providing the base unit with a detector responsive to this different pilot tone, and by providing enabling circuitry for responsively disabling the audio amplifier, conventional circuitry may readily be modified by those skilled in the art to provide the desired function. FIG. 3 shows a cordless answering system consisting of a combined base unit and answering machine 200 and a remote unit 101. A cassette 202 is shown installed in the base unit 200. Function control buttons 204—204 are provided for manual operation of the system into various modes, e.g., record, rewind, answer, pause and similar functions. A number of status-indicating lights 203—203 may optionally be provided. A volume control 206 is also provided. A jack (not shown) on the rear of the combined system 200 replicates the function of jack 50 shown in FIG. 4, and is adapted for connection to telephone lines. The remote unit 101 is adapted to be cradled within a charging well in the base unit 200, so that battery charging contacts 143—143 will make contact with similarly disposed charging contacts to 210—210 within the charging well 208. On one side at the upper end of the remote unit 101 is a 3-position switch actuator mechanically coupled to actuate the mode switch 118 of the remote unit (FIG. 5) between "standby" and "talk" positions, as well as a power-off condition, removing all power to the remote unit 101 from its internally contained rechargeable battery. A 2-position switch handle 148 operatively coupled to switch element 130 associated with the dialing encoder 132 allows the user to select pulse dialing or tone dialing modes. In addition to 12 dialing pushbuttons 134—134, there are also provided various function buttons 150—150 actuating various features frequently incorporated into such remote units, such as automatic redialing of a previously dialed number, a memory system storing and later recalling frequently dialed numbers, and similar other functions as desired. Status indicator lights 152—152 are provided as desired, one such light being frequently dedicated to warn the user of a low battery voltage condition. Finally, a switch actuator 154 is provided operatively coupled to the switching elements S100, S102 of the screening mode switch assembly 120 so that the user enters screening mode by depression of this element.

The foregoing has served to describe how a conventional cordless telephone may be modified so that when connected to a conventional answering machine of the remote pick-up type, the desired screening function will be provided. The details of how such modification may be carried out in a conventional cordless telephone will be readily apparent to those who are skilled in the art.

The preferred approach is to physically combine the base unit with the answering machine in a common housing and to govern all operations from a single microprocessor. In the discussions to follow a preferred form of base unit circuit will be discussed, along with its associated sensing and control ports. Additionally the modifications necessary to incorporate cordless telephone control and sensing into the program control of an answer machine will be described.

It will be recognized that the base unit controller 56 is called upon to perform various functions sequentially in response to receipt of command signal information received at different times from different sources. As is common practice, the preferred approach is to use a microprocessor operating under a stored program to interrogate in a touring fashion a number of ports connected to the code detector 82, the first pilot tone detector 84, the second pilot tone detector 88, the ring detector 62, and the line sensor 86, and to act responsively to the port sensing to operate the line switch S58, the encoder 72, the transmitter enabling circuits 64 and the audio amplifier enabling circuit 90.

FIGS. 6A–6H show a schematic diagram of a cordless telephone base unit configured for interaction with a microprocessor-controlled answering machine.

FIGS. 7A–7C show the corresponding flow chart for such an answering machine, in particular indicating sensing and commands communicated from and to the base unit from interface terminals communicating with microprocessor ports. It will be noted that a considerable number of terminals are provided at the right-hand side of the diagrams shown in FIGS. 6C, 6F, and 6H. Their status and functions are summarized below.

1. Interface terminal L delivers audio signals from the telephone line to the answering machine during the record mode.

2. Interface terminal E receives control signal commands from the microprocessor to mute audio transmission to the telephone lines from the base unit receiver during record mode. A high state received at this terminal causes muting to keep receiver noise or stray signals off the telephone lines.

3 Interface terminal D receives audio transmissions from the answering machine and outputs them to the telephone lines via amplifier 1C104-D.

4. Interface terminal R and T are connected to the telephone line and provide two-way communication between the base unit and the calling party.

5. Interface terminal I receives microprocessor commands to actuate the base unit to an on-hook or off-hook state. A low state actuates the base unit to an off-hook condition.

6. Interface terminal K outputs to the microprocessor a momentary high state in response to each ringing signal received from the telephone lines, this information being used by the microprocessor to initiate a ring-count routine resulting in automatic pick-up and playback of the message of the incoming party, each such ring burst being announced by a momentary high state at this terminal.

7. Interface terminal F receives commands from the microprocessor. When high it turns the transmitter off, and when held low, will hold the base unit transmitter on and inhibit generation of a frequency shift keying (hereinafter referred to simply as FSK) code by the base unit.

8. Interface terminal J provides to the microprocessor a low state indicating that a 5.6 kilohertz pilot tone is currently being received by the base unit receiver, reversion to a high state indicating loss of such tone.

9. Interface terminal E receives microprocessor commands to operating a noise muting circuit adequate to mute receiver noise in the absence of a 5.6 kilohertz pilot tone receipt sensing at interface terminal J. A low state mutes.

In all of the foregoing, where power is required to implement a command from the microprocessor, the presence of a suitable driver in the associated circuitry is implied.

Before considering the various and, states of the base unit shown in FIGS. 6A-6F, a brief overview will be given of the basic circuit elements. Information from the telephone lines is brought in via interface terminals R and T to terminals 1 and 3 of line coupling transformer HB101 via a hook relay K101 actuated by a relay coil K101'. Output terminal 4 of transformer HB101 returns audio signals to interface terminal L to provide the incoming caller's dictated message to the answering machine during record mode. Terminal 6 of transformer HB101 receives audio communication from the base unit receiver (to be discussed), and passes it to the telephone line terminals R and T.

The principal elements of the receiver are an input buffer amplifier, Q101, a mixer/converter stage Q102, and a local oscillator using Q103, and an IF. amplifier/detector IC101 using the integrated circuit chip type MC3359. Detected audio and FSK output appears at terminal 10 of IC101, this element further having an additional operational amplifier having pin 12 as its input terminal and pin 13 as its output terminal. As will be discussed, this operational amplifier is used in conjunction with transmitter modulation.

The audio and FSK receiver output from pin 10 of IC101 is sent in two directions. It is split to enter a parallel-resonant filter element tuned to 5.6 kilohertz filter consisting of inductor CH102 and precision capacitor C119, and similarly through a network resonating at 4.1 kilohertz and employing inductor CHI03 and precision capacitor C123. The 5.6 kilocycle filter output is passed to element IC102, a phase locked loop detector having pin 3 as its input terminal. A 5.6 kilohertz signal with sufficient amplitude will cause output terminal 8 of IC102 to go low. As will subsequently be discussed, detector IC102 can be disabled simply by pulling pin 6 low, thereby disabling the oscillator that serves the phase locked loop. A similarly configured circuit based upon element IC103 senses the presence of the 4.1 kilohert screening tone to produce a low state at terminal 8 thereof.

The audio and FSK output from terminal 10 of IC101 is also passed through a low-pass filter consisting of elements R112 and C120. This filter will remove pilot tones of either frequency, while allowing the FSK and voice signals to pass through. The FSK house code signals are passed via elements C124, R114 to control the system operation in a way to be discussed subsequently. The output from the low-pass filter is also fed through element string C125-RV101-R125 to an audio amplifier IC104-D, and thence through transistor Q107, configured as an emitter follower feeding terminal 6 of the telephone line transformer HB101.

Muting transistor Q108 quiets audio transmission of receiver noise to the telephone line during the time that the answering machine is in record mode. Audio signals are then fed through transformer HB101 out to the telephone line terminals R,T.

The principal elements of the transmitter are a frequency modulated oscillator based upon transistor Q110 feeding a buffer output amplifier transistor Q109, the output from this element feeding frequency modulated signals to the antenna. The oscillator circuit based upon transistor Q110 is modulated from telephone lines from terminal 2 of transformer HBIOI via element string R134, R124, C130, C128 to the operational amplifier input pin 12 (IC101). The amplifier output pin 13 feeds the incoming caller's conversation to the oscillator circuit based on transistor Q110 via elements C172 and R179. This same output signal from pin 13 of ICIOI is also used to feed the automatic level control transistor pair Q104, Q105 to provide regulated audio output level to maintain a proper modulation index.

Transmitter enabling and disabling is achieved by turning the power supplied to transistors Q110 and Q109 alternately on or off. Power is delivered to these transistors through enabling transistor Q106, which in turn is enabled by operational amplifier IC104-A, which in turn is actuated by operational amplifier IC 104-C relaying ringing signal bursts from telephone lines coming in from interface terminals R, T.

A great many functions are done automatically within the circuit shown in FIGS. 6A-6F without requiring microprocessor command, these functions and modes being largely governed by an encoder/decoder circuit IC105 (Motorola type No. LSC4210P), and this element must first be discussed in detail. The encoder/decoder chip IC105 is provided with a number of address pins A0-A8, of which pins A0-A4 are employed in the preferred embodiment. Pins A2-A4 are hard-wired to ground them according to codes preassigned to different production lots of base units at the factory. The settings of pins A2-A4 will thus govern three bits of the FSK code to be detected and generated by the encoder/decoder IC105. Pins A0 and A1 are user-set to establish the FSK codes in the base unit and receiver of his particular installation.

The encoder/decoder chip IC105 has the capability of outputting a recognition condition responsively to receipt of matching FSK string delivered to input terminal 12, and to output an FSK string upon receipt of an actuating command (high) received at terminal 10, the FSK string being outputted at terminal 16. Receipt of a matching input FSK string at terminal 12 toggles output pin 15 to its opposite state on each occurrence. A high condition applied to terminal 13 resets terminal 15 to its opposite state Additionally, sensing terminal 11 puts out a momentary high condition during that brief interval of time when the FSK string is being generated. The encoder/decoder IC105 automatically sends the FSK family codes as a sequential pair when generating them, and when in receipt modes will acknowledge receipt of either element of a received pair which achieves a match with the stored code.

Considering the circuit of FIG. 6 in more detail, the first case to be considered will be that of the incoming call from the telephone lines. The low frequency ringing signal is received from interface terminals R, T to be rectified through the full-wave bridge rectifier D111, D112, D113, D114, the dc output being relayed to operational amplifier IC104-C via an optical coupler PC101. The resulting change in output states of IC104-C responsively to the receipt of the ringing burst momentarily enables the transmitter-enabling transistor Q106 via operational amplifier IC104-A. The transmitter section is thus energized responsively to receipt of each burst of ringing signal to place its carrier signal on the air.

The output of IC104-C is also relayed to the microprocessor via interface terminal K, each burst being used to increment a stored running tally of the number of ringing bursts received. After a preset number of ringing bursts have been sensed, the microprocessor drives interface terminal I low, thereby energizing the hook relay coil K101, to actuate the relay switch K101 to a closed condition (off-hook). All operations of the hook relay are microprocessor controlled, including the pulse dialing interruptions for placing outgoing calls from a remote units, as will be discussed subsequently.

This same ring burst signal that is fed to terminal K is also fed to enabling terminal 10 of the encoder/decoder chip IC105 to cause the immediate outputting of the stored house code to the transmitter from terminal 16 via element R168. Thus an FSK pair will be transmitted to the remote unit responsively to receipt of each ringing burst to actuate the buzzer in the remote unit. During the sending of the FSK pair, upon receipt of each ringing signal, Q105 is actuated by sensing pin 11 of the encoder/decoder IC105 via resistor R164 to prevent telephone line signals from being passed to the modulator, thereby preventing any such spurious information from interfering with clean transmission of the FSK code pair.

In the event that the user does not choose to answer the call, the answering machine will play its prerecorded message to the base unit via interface terminal D, this message being sent to the telephone lines via IC104-D, transistor Q107, and the line matching transformer HB101. During the subsequent recording phase wherein the incoming caller records his message, this audio frequency information from the telephone lines is relayed to the answering machine from interface terminal L.

During the record mode of the answering machine, interface terminal E is held high to prevent any noise from the receiver section getting through to the telephone lines by enabling transistor Q108.

At any time before the incoming caller hangs up, the user may, as previously described, either enter "talk" mode wherein an FSK pair is automatically generated by his remote unit, along with a 5.6 kilohertz pilot tone, or alternatively he may go to "screen" mode, similarly generating an FSK pair and a 4.1 kilohertz pilot tone. As previously discussed, the received FSK family codes are fed by elements C124, R114 to terminal 12 (data input) of ICI05 Prior to receipt of a proper matching code, output terminal 15 (code match) is in a "low state" As a result both phase locked loop oscillators associated with the pilot tone detectors IC102 and ICI03 are disabled through diodes D101 and D109.

Immediately upon receipt of a matching FSK code, pin 15 of the encoder/decoder IC105 goes high, enabling both of the tone detectors IC102, IC103. Assuming that the user has elected "talk" mode, tone detector IC102 will output a low state at pin 8, placing a similar condition on interface terminal J to inform the microprocessor that a tone has been received. For purposes of future reference, when the user initiates an outgoing call in the pulse dialing mode (as contrasted with touch-tone dialing) and wherein it will be recalled that dialing pulses are signaled as momentary interruptions in the 5.6 kilohertz pilot tone, these pulse dialing interruptions will similarly be relayed to interface terminal J. This will be discussed in more detail subsequently.

If it has not done so already after receiving the preset number of ringing counts, in response to such a pilot tone receipt at interface terminal J the microprocessor will place a low state on interface terminal I, thereby energizing the relay coil K101' to close switch K101. The system is now off-hook. The microprocessor routine then goes to stop mode, releasing the muting condition applied to interface terminal E, and enabling a two-way communication between the remote unit and the incoming caller.

At the termination of the conversation the user operates his handset from "talk" mode to "standby" mode as previously described, and two family codes are transmitted, whereupon the remote transmitter shuts down. Receipt of the FSK code causes pin 15 of the encoder/decoder chip IC105 to toggle to the low state, thus disabling the tone detector IC102 and placing a high condition on its output pin 8. This change of status is relayed to interface terminal J as a high (no tone) state. Upon receipt of this signal condition, the microprocessor outputs a high state to interface terminal I, de-energizing the hook relay coil K101' to open switch K101, thus placing the base unit on-hook. The microprocessor then enters an 800 millisecond timing loop, during which interval the status of interface terminal J is periodically interrogated. If the low state (no tone) is maintained, then after 800 milliseconds, a high state is sent to terminal F, turning off the transmitter by turning off transistor Q106 via diode D108, the system then reverting to the dormant state.

If tone should be restored (J low) before the 800 millisecond period has expired, then the microprocessor will drive interface terminal I low, placing the base unit off-hook again. A continuous touring of interface terminal J will then be re-instated to sense for remote unit hang-up. As will be discussed, the above-mentioned cycling between on-hook and off-hook conditions responsively to short-term pilot tone loss is used to govern pulse-dialing when the user initiates an outgoing call from the remote unit.

In the event, that instead of switching his remote unit to "standby", the user should walk to an unfavorable location causing loss of pilot tone to be detected, then pin 8 of decoder IC102 will go high, causing interface terminal J to go high (no tone). In this case the microprocessor response is, as before, to drive interface terminals F and I high, placing the transmitter in a dormant state until the next ring burst is received, and placing the unit on-hook. Since output terminal 15 of the encoder/decoder element IC105 is of the toggling type, it must be reset to a condition corresponding to receipt of the turnoff FSK code. This occurs automatically because when interface terminal F is driven high, diode D105 is enabled to allow capacitor C159 to charge to a high state to actuate the reset terminal 13 of the encoder/decoder chip IC105, thereby restoring its output sensing state 15 to its opposite state. Thus, irrespective of whether system shutdown is initiated by transmission of an FSK signal from the remote unit or alternatively from loss of pilot tone, system shutdown is properly governed by microprocessor sensing and commands.

Considering next the situation wherein the user elects "screening" mode, the 4.1 kilohertz pilot is generated along with the FSK code and maintained thereafter by the remote unit. The FSK detection proceeds as before, both tone detectors IC102, IC103 being initially disabled, and thereafter enabled, the resulting low state on output terminal 8 of IC103 enabling transistor Q106 via diode D103 to turn on the transmitter. In this case, however, the objective is to prevent transmission of any audio signals from the receiver to the telephone lines, and in particular any relatively strong signals arising from noise or voice sources near the handset microphone. To achieve such strong muting the low state appearing at output terminal of ICI03 is relayed to the non-inverting input of IC104-B, effectively killing all audio signal applied thereto by grounding the attenuating resistor R118. Audio pass-through does not occur. Moreover, under such conditions the answering machine must not be forced into its quiescent state, it must continue its normal sequence of operations, i.e. playback the recorded message, record the incoming message, and go on-hook.

Screening mode is terminated either by the operator turning his handset to "standby" mode, or alternatively by loss of the 4.1 kilohertz pilot tone at the base unit receiver. Considering first the system reversion when the remote handset is operated to "standby" mode, as before the family code is transmitted, output pin 15 of the encoder/decoder element IC105 is toggled to a low state disabling the 4.1 kilohertz tone detector IC103 via diode D109. This also drives output pin 8 of IC103 high, turning off the transmitter via diode D103 acting and switching comparator ICI04-A. Also, this same high state on pin 8 of IC103 releases the muting condition placed on the pass-through amplifier IC104B through diode DI07. No microprocessor control is necessary to control system reversion.

Alternatively, in the event that pilot tone is lost, pin 8 of the detector IC103 will again go high. This high state on pin 8 of IC103 disables the transmitter. Since no FSK pulse has been received, pin 15 of the encoder/decoder IC105 is still high and must be reset to a low state to restore system configuration. It will be seen that as long as pin 8 of the 4.1 kilohertz detector IC103 remains low, capacitor C159 was bled down essentially flat via diode D104. Now, however, D104 is in a blocking condition and capacitor C159 slowly charges from pin 15 of the encoder/decoder IC150 via resistor R167. After approximately 100 milliseconds pin 13 (reset pin) of IC105 reaches a sufficiently high voltage to toggle the output at pin 15 thereof to a low state. This then disables the decoders IC102 and IC103, and the base unit is now reverted to its quiescent state.

Considering finally the initiating of an outgoing telephone call by the remote user, upon actuation of the remote unit from "standby" to "talk" receipt of the FSK code by the base unit again causes pin 15 of encoder/decoder element IC105 to go high, thereby enabling the tone detectors IC102 and IC103. Because the 5.6 kilohertz pilot tone is being detected, pin 8 of detector IC102 goes low, thereby sending a low (tone present) condition to interface terminal J, thus informing the microprocessor that an outgoing call is to be initiated. So long as this condition is maintained at interface terminal J, the microprocessor response is to drive interface terminal F low, thereby actuating the transmitter and enabling amplifier IC104A through diode D108 to supply power to the transmitter. Additionally, the microprocessor outputs a low signal condition to interface terminal I, energizing coil K101' and placing the system on-hook. In the event that such initiation is followed by touch-tone dialing, these low frequency two-tone transmissions are sent to the telephone lines interface terminals R and T via the pass-through amplifier IC104-B. Two way communication between the remote user and the telephone central office is thus established.

If, on the other hand, pulse dialing is employed, then it will be recalled that this is signaled by a series of brief interruptions of the pilot tone detected at pin 8 of detector IC102. Thus pin 8 will go momentarily high during a brief series of intervals while the dialing pulse strings are being transmitted. Such momentary transitions are sensed at interface terminal J as brief changes of state, these changes of state being relayed to interface terminal I controlling the hook relay coil K101' to place the switch K101 into a series of momentary off-hook conditions to signal to the central office that pulse dialing is in process. During all off-hook conditions the microprocessor places a muting (low) state on interface terminal H to prevent audio feed through from the receiver of any audio signals so as to keep such signals off telephone lines during the pulse dialing releases of switch K101.

The microprocessor timing loop which breaks out 800 milliseconds after receipt of loss-of-tone condition at interface terminal J is never completed, with the result that system shutdown attendant to long-term loss of pilot tone does not occur in such situations.

One basic aspect of the screening pilot tone responses should be restated. The microprocessor never responds to receipt of the 4.1 kilohertz pilot tone, since no signal condition is placed on interfacial terminal J by its presence. Enabling the base unit and strong muting of audio pass-through to the telephone lines is accomplished directly by base unit circuitry. The presence of the normal 5.6 kilohertz pilot tone, on the other hand, is sensed by the microprocessor repeatedly to govern system control.

FIGS. 7A–7C show a representative flow chart governing a microprocessor adapted to govern an answering machine according to the foregoing principles. In particular, it represents the necessary adaptation of a conventional answering machine program so as to properly interact with a base unit of the type previously described.

For simplicity, the system will first be described with the answering machine turned off so as not to play its recorded message or record the incoming caller's message. The case of the outgoing call will be considered first. As seen in FIGS. 7A and 7B, the system is first brought to a properly initialized reset condition by steps 300 and 301. At this point, a polling tour of the user-operated function buttons occurs at step 302, a change in state at the associated port is detected at step 303, and the commanded function is performed at step 304, thereupon the polling initiated at step 302 continues. If no user-operator buttons have been depressed during a given tour, branching immediately occurs to step 305, wherein interface terminals K and J are interrogated for a change of state. If a ring burst has been detected from the telephone line, placing a high state on interface terminal K, an FSK pair is hardware-outputted as previously described. Since the answering system is off, at step 314 wherein the status of this port is interrogated, system control then branches to step 307 wherein interface port J is sensed for presence of the 5.6 kilohertz pilot tone. In the event that the remote user has yet to actuate his unit to "talk" mode, program control branches back to button polling step 302 via the node labeled "dormant state" 317

Since we are now considering the situation of the outgoing call, such a tone sensing will occur in due course, and program flow branches instead to step 308, placing the base unit off-hook, enabling the transmitter, and enabling audio pass-through through the receiver. At step 309 interrogation is made to establish whether or not the pilot tone has disappeared, which will occur under user control if he completes his conversation and operates his unit to standby, or if he dials his outgoing call in pulse-dialing mode. In either case, program flow then proceeds to step 310, placing the base unit on-hook. At steps 311 and 312 sensing is made of permanent (i.e. more than 800 milliseconds) loss of pilot tone, or restoration thereof in less time, as is the case in pulse dialing. Short-term restoration then causes branching to step 316, again placing the base unit off-hook, program flow then going back to step 309 to sense for subsequent loss of pilot tone. In the event that long-term pilot tone loss has occurred, program flow then goes from step 312 to step 313, wherein the transmitter is disabled, and the receiver audio pass-through is disabled. The system is now on-hook (from step 310) and system control then reverts to the dormant state 317.

Considering next the incoming call with the answering machine in the non-playing, non-recording mode, button polling occurs as before via dormant state node 317, the interrogation is proceeding as before at step 306. Ringing bursts are sent out as before, and interface terminal J is sensed for pilot tone and FSK code received from the remote handset. Upon receipt of such a tone and code, system program flow then branches as before to step 308, setting up two-way communication between the telephone lines and remote unit. System reversion to the dormant state at the end of the conversation proceeds as before upon long-term loss of pilot tone.

Considering next the situation in which the answering machine is in its active state, and with particular reference to FIG. 7C, it will be noted that immediately upon receiving a ringing burst from the telephone line at step 306, with the answering system on, system control then branches to "answer" subroutine 400 shown in FIG. 7C. Each burst increments the ring counter as shown in step 401, and decisional branching based upon whether the number of ring counts equals the predetermined ring count is made in step 402. If the answering machine has not yet picked up, then branching immediately occurs to node 315 labeled "Receive Check" to enter step 307, which interrogates for pilot tone presence produced by the remote handset, program flow then branching up to dormant state 317 if no such tone is detected.

It will further be noted that if the remote user operates his remote handset from "standby" to "talk" mode, then program branching is immediately to step 308 to initiate two-way conversation. If, on the other hand, the user has not so operated his remote handset at the time the predetermined number of ringing bursts have been counted, then program flow goes to step 403, wherein the base unit goes off-hook, the answering machine is enabled to play, after which audio pass-through to the telephone lines is disabled and the answering machine proceeds to record mode followed by an immediate sensing for actuation of the remote unit to "talk" at step 404. If this does not occur within a preset time established by step 405, representing the time necessary for the tape player to broadcast its announcement and record any incoming messages, then program flow is to step 406, placing the base unit on-hook and enabling audio pass-through, then proceeding to the dormant state 317 of FIG. 7A.

If, on the other hand, the user operates his remote unit to "talk", then program flow branches at step 404 to step 407, stopping the answering machine, enabling the transmitter, and enabling receiver audio pass-through to the telephone line. At this point two-way communication is established between the user and the in-coming caller, a continuous sensing for pilot tone loss (J state) being maintained at step 408. Receipt of a matching FSK code, or in the alternative, loss of the pilot tone, causes program flow to proceed to step 409, wherein the base unit goes on-hook, the transmitter is disabled and audio pass-through between the telephone lines and the receiver is disabled, after which reversion to the dormant state 317 occurs.

It will be evident to those skilled in the art that a great many variants of the foregoing program may equally well be employed to adapt a microprocessor controlled answering machine and microprocessor controlled cordless telephone to a combined unit governed by a single microprocessor performing both the functions of the conventional microprocessor controlling an answering machine, as well as the microprocessor used to control the base unit of the cordless telephone.

Additionally, it should be recognized that the changing of system operation responsively to different pilot tones and the loss thereof may be accomplished by a great many variants of such control signal conditions. Simple carrier capture may, for example be used in place of a 5.6 kilohertz pilot tone. Mode changeovers may also be accomplished, for example, by special FSK pulse bursts and properly coded detectors. These and all related forms of handset-originated signal conditions governing base unit response are to be construed as being within the ambit of the appended claims.

I claim:

1. In combination with a telephone answering machine having connector means for making connection to telephone lines, said answering machine including recording and playing means operable to a playing mode for sending out onto telephone lines a recorded announcement and to a recording mode for recording incoming messages thereafter, and system control means operable between an active mode establishing communication between said telephone lines and telephone means and a passive mode establishing communication between said telephone lines and said recording and playing means:

telephone means in the form of a cordless telephone means including a base unit and a portable handset each having transmitter and receiver means, said base unit transmitter including means for transmitting to said handset receiver means ringing signals and incoming messages received from said telephone lines, said handset transmitter means having means for transmitting to said telephone lines through said base unit receiver means voice communications from the user and command means for transmitting to said base unit receiver means user-chosen control signal conditions, said system control means including means responsive to receipt of said control signal conditions by said base unit receiver means for operating said system control means between said active and passive modes, and said recording and playing means, said system control means, and said base unit are contained within a common housing.

2. The combination of claim 1 wherein said common housing has an open-top recess into which said handset is stored and charged when not in use.

3. In combination with a telephone answering machine having connector means for making connection to telephone lines, said answering machine including recording and playing means operable to a playing mode for sending out onto telephone lines a recorded announcement and to a recording mode for recording incoming messages thereafter, and system control means operable between an active mode establishing communication between said telephone lines and a telephone means and a passive mode establishing communication between said telephone lines and said recording and playing means:

telephone means in the form of cordless telephone means including a base unit and a portable handset each having transmitter and receiver means, said base unit transmitter means including means for transmitting to said handset receiver means ringing signals and incoming messages received from said telephone lines, said handset transmitter means having means for transmitting to said telephone lines through said base unit receiver means voice communications from the user and command means for transmitting to said base unit receiver means user-chosen normal and screening control signal conditions, said base unit receiver means including means responsive to receipt of said normal control signal condition for operating said system control means from said passive to said active mode, means responsive to receipt of either said normal or said screening control signal conditions for actuating said base unit transmitter means to transmit incoming messages from said telephone lines, and screening means responsive to receipt of said screening control signal condition for preventing placing a signal condition on said telephone lines indicating that the user is listening.

4. The combination of claim 3 wherein said screening means includes means for preventing said base unit receiver means from passing to said telephone lines voice communications received from said handset.

5. The combination of claim 4 wherein said handset includes pilot tone generating means for generating said screening control signal condition as a screening pilot tone modulating the output of said handset transmitter means, and said base unit screening means includes screening pilot tone detection means responsive to receipt of said screening pilot tone from said base unit receiver means for preventing passage of voice audio frequency information from said base unit receiver means to said telephone lines.

6. The combination of claim 5 wherein said handset includes normal tone generating means for generating said screening control signal condition as a normal pilot tone modulating the output of said handset transmitter means, and said base unit receiver means includes normal pilot tone detection means responsive to receipt of said normal pilot tone to operate said base unit transmitter means to transmit to said handset incoming voice communications received from said telephone lines and to operate said system control means from said passive to said active mode.

7. The combination of claim 6 wherein said system control means when in said active mode includes means responsive to the loss of both pilot tones by said base unit receiver means for reverting to said passive mode.

8. The combination of claim 7 wherein said base unit receiver means has associated therewith low-pass filter means for strongly attenuating transmission to said telephone lines of signals above a given cutoff frequency, said frequencies of said screening and non-screening pilot tones are different from each other, and said pilot tone frequencies are above said cutoff frequency.

9. The combination of claims 3, 4, or 6 wherein said handset transmitter means includes means for transmitting an identification code to said base unit receiver means and said system control means includes inhibiting means responsive to receipt of said identification code by said base unit receiver means for preventing transmission of incoming voice messages by said base unit transmitter means until said identification code is received.

10. The combination of claims 3, 4, or 6 wherein said recording and playing means, said system control means, and said base unit are contained within a common housing.

11. The combination of claim 10 wherein said common housing has an open-top recess into which said handset is stored and charged when not in use.

* * * * *

REEXAMINATION CERTIFICATE (1646th)
United States Patent [19]
Scordato

[11] B1 4,881,259

[45] Certificate Issued  Feb. 25, 1992

[54] ANSWERING MACHINE WITH CORDLESS TELEPHONE

[75] Inventor: James Scordato, Elmhurst, Ill.

[73] Assignee: Dynascan Corporation

Reexamination Request:
No. 90/002,214, Nov. 30, 1990

Reexamination Certificate for:
Patent No.: 4,881,259
Issued: Nov. 14, 1989
Appl. No.: 294,429
Filed: Jan. 6, 1989

[51] Int. Cl.$^5$ .......................... H04B 7/26; H04M 1/64
[52] U.S. Cl. .................................. 379/58; 340/311.1; 379/56; 379/61; 379/67
[58] Field of Search .................. 379/67, 58, 61, 62, 379/63, 82, 88; 340/311.1, 825.44

[56] References Cited
U.S. PATENT DOCUMENTS

| | | | |
|---|---|---|---|
| 3,133,992 | 5/1964 | Dickman | 379/74 |
| 3,860,756 | 1/1975 | Shinoi et al. | 379/389 |
| 3,925,618 | 12/1975 | Kato et al. | 379/389 |
| 4,500,752 | 2/1985 | Lee | 379/61 |
| 4,677,655 | 6/1987 | Hashimoto | 379/61 |
| 4,706,274 | 11/1987 | Baker et al. | 379/61 |

FOREIGN PATENT DOCUMENTS

59-74739  4/1984  Japan .

OTHER PUBLICATIONS

"Roamphone IQ 1100, IQ 1110 & IQ 1120 Service Manual", pp. 1-10 and 48-51, Phone-Mate, Inc. (undated).
"Phone-Mate Roamphone IQ 1110/1120/1121/1140 Owners Manual", eight pages, published 4/84.

*Primary Examiner*—Thomas W. Brown

[57] ABSTRACT

A cordless telephone and an answering machine of the remote-pickup type are provided as an integrated unit having the answering machine and telephone base unit integrated into a common housing. The remote handset contains circuitry for generating a command signal condition at the user's option which will operate the base unit to a "screening mode" wherein the activity on the telephone lines during the playback and record period is transmitted to the remote unit, but wherein audio pass-through from the base unit radio receiver is disabled. In the preferred form of the invention the command signal condition is in the form of a pilot tone of a given frequency, receipt of which by the base unit receiver disables audio pass-through. To enter two-way "talk" mode, a pilot tone of different frequency is also sent by the remote unit, loss of this tone being being to cause the base unit to cease transmitting to the remote unit.

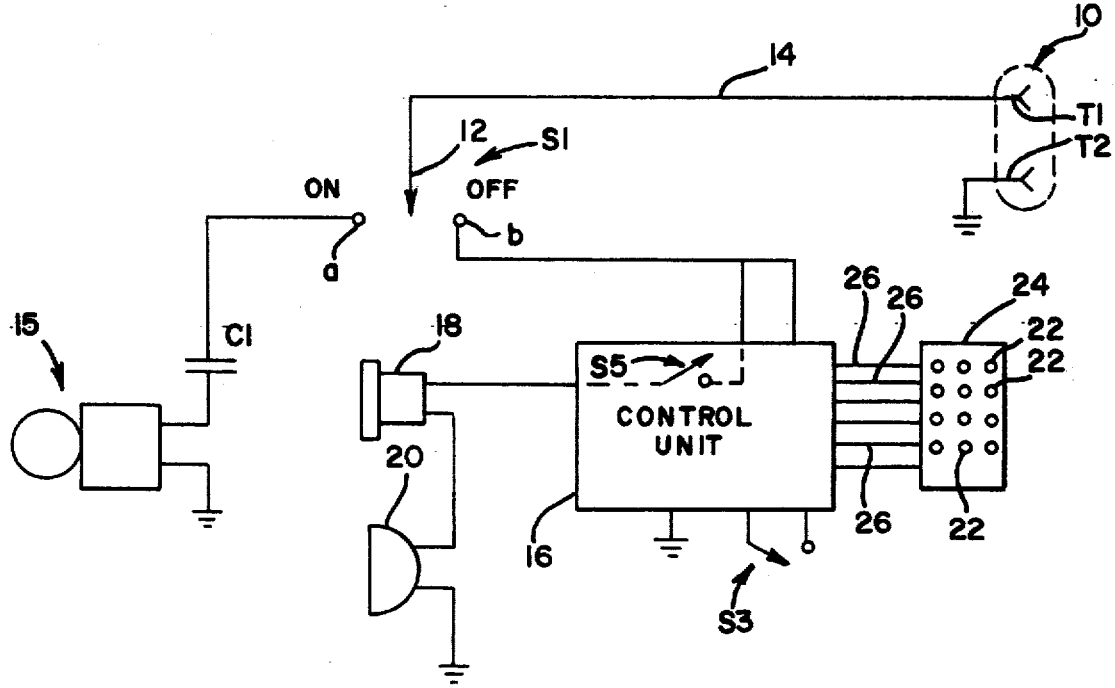

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3–11 is confirmed.

Claim 1 is determined to be patentable as amended.

Claim 2, dependent on an amended claim, is determined to be patentable.

New claims 12–16 are added and determined to be patentable.

1. In combination with a telephone answering machine having connector means for making connection to telephone lines, said answering machine including recording and playing means operable to a playing mode for sending out onto telephone lines a recorded announcement and to a recording mode for recording incoming messages thereafter, and system control means operable between an active mode establishing *two-way* communication between said telephone lines and telephone means and a passive mode, establishing communication between said telephone lines and said recording and playing means;

telephone means in the form of a cordless telephone means including a base unit and a portable handset each having transmitter and receiver means[,] ; *said handset having a user operable screening mode-producing switch means operable from an initial dormant condition to a screening condition and other separate user operable switch means operable to talk and standby conditions,* said base unit [transmitter] *and handset* including *respective* means for transmitting *by the base unit transmitter means* to said handset receiver means ringing signals *heard by the user when said other switch means is operated to said standby condition,* and incoming messages received from said telephone lines[,] *heard by the user when said other switch means is operated to said talk condition or when said screening mode-producing switch means is operated to said screening condition;* said handset [transmitter means having] *including* means for [transmitting] *effecting the transmission by the handset transmitter means* to [said telephone lines through] said base unit receiver means *of a user chosen command signal when said other switch means is operated to said talk condition and for effecting the transmission through the handset transmitter means and said base unit receiver means to said telephone lines of* voice communications from the user [and command means for transmitting to said base unit receiver means user-chosen control signal conditions,] *when said other switch means is operated to said talk condition but not when said screening mode-producing switch means is operated to said screening* condition, said system control means including means responsive to receipt of said [control signal conditions by said base unit receiver means] *user chosen command signal* for operating said system control means [between] *from* said [active and passive modes,] *passive to said active mode to effect said two-way communication; and said recording and playing means, said system control means, and said base unit* [are] *being* contained within a common housing.

12. *In combination with a telephone answering machine having connector means for making connection to telephone lines, said answering machine including recording and playing means operable to a playing mode for sending out onto telephone lines a recorded announcement and to a recording mode for recording incoming messages thereafter, and system control means operable between an active mode establishing two-way communication between said telephone lines and telephone means and a passive mode, establishing communication between said telephone lines and said recording and playing means;*

*telephone means in the form of a cordless telephone means including a base unit and a portable handset each having transmitter and receiver means; said handset having a user operable screening mode-producing switch means operable from an initial dormant condition to a screening condition and other separate user operable switch means operable to talk and standby conditions, said screening mode-producing switch means including a manually engageable member which must be moved from an initial dormant position to a second position and held manually in such position to initiate and maintain said screening mode and is returned to said dormant position upon release thereof, so that the operating condition of said other switch means then determines the operating mode of the combination; said base unit and handset including respective means for transmitting by the base unit transmitter means to said handset receiver means ringing signals heard by the user when said other switch means is operated to said standby condition, and incoming messages received from said telephone lines heard by the user when said other switch means is operated to said talk condition or when said screening mode-producing switch means is operated to said screening condition; said handset including means for effecting the transmission by the handset transmitter means to said base unit receiver means of a user chosen command signal when said other switch means is operated to said talk condition and for effecting the transmission through the handset transmitter means and said base unit receiver means to said telephone lines of voice communications from the user when said other switch means is operated to said talk condition, but not when said screening mode-producing switch means is operated to said screening condition, said system control means including means responsive to receipt of said first user chosen command signal for operating said system control means from said passive to said active mode to effect said two-way communication; and said recording and playing means, said system control means, and said base unit being contained within a common housing.*

13. *The combination of claim 3 wherein said control signal conditions include a first normal signal condition when said system control means is normally operated from said passive mode to said active mode, and a second screen-* ing signal condition where said system control means is in a modified active condition where said base unit transmitter means transmits to said handset receiver means the incoming messages from said telephone lines so that the called party can hear them but sounds at the handset location do not reach the telephone lines.

14. The combination of claim 3 wherein said handset includes first user operable switch means for generating said normal and screening control signal conditions, said first switch means includes a first manually operable member which when momentarily engaged assumes a position which effects generation of said normal signal condition and second switch means operable to a screening condition which effects generation of said screening control signal condition.

15. The combination of claim 14 wherein said second switch means includes a manually engageable member which must be moved from an initial dormant position to a second position and held manually in such position to effect generation of said screening control condition and is returned to said dormant position.

16. The combination of claim 14 or 15 wherein said first switch means includes a manually engageable member which must be physically moved into different stable positions where the member remains in its adjusted position upon release thereof.

* * * * *